United States Patent
Sakakibara

(10) Patent No.: US 11,381,764 B2
(45) Date of Patent: Jul. 5, 2022

(54) SENSOR ELEMENT AND ELECTRONIC DEVICE

(71) Applicant: Sony Semiconductor Solutions Corporation, Kanagawa (JP)

(72) Inventor: Masaki Sakakibara, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/971,587

(22) PCT Filed: Feb. 13, 2019

(86) PCT No.: PCT/JP2019/004933
§ 371 (c)(1),
(2) Date: Aug. 20, 2020

(87) PCT Pub. No.: WO2019/167608
PCT Pub. Date: Sep. 6, 2019

(65) Prior Publication Data
US 2021/0092313 A1   Mar. 25, 2021

(30) Foreign Application Priority Data
Feb. 27, 2018 (JP) ............... JP2018-033621

(51) Int. Cl.
*H04N 5/357* (2011.01)
*H04N 5/374* (2011.01)
(Continued)

(52) U.S. Cl.
CPC .......... *H04N 5/357* (2013.01); *H04N 5/3742* (2013.01); *H04N 5/37457* (2013.01); *H04N 5/378* (2013.01)

(58) Field of Classification Search
CPC ...... H04N 5/357; H04N 5/378; H04N 5/3742; H04N 5/3745; H04N 5/37457; H04N 5/37455; H01L 27/14643; H01L 27/14612
(Continued)

(56) References Cited

U.S. PATENT DOCUMENTS

2010/0091167 A1* 4/2010 Azami .................... H04N 5/225
                                                                    348/294
2011/0169681 A1* 7/2011 Naka ....................... H03M 1/34
                                                                    341/158
(Continued)

FOREIGN PATENT DOCUMENTS

WO   2016/136448 A1   9/2016

*Primary Examiner* — Marly S Camargo
(74) *Attorney, Agent, or Firm* — Michael Best & Friedrich LLP

(57) ABSTRACT

The present disclosure relates to a sensor element and an electronic device that can further reduce noise.
In a solid-state imaging apparatus that performs AD conversion in a pixel, a comparator circuit included in the pixel at least has: a comparing unit that compares a pixel signal output from a pixel circuit with a reference signal which is a slope signal whose level monotonously decreases with time; a band limiting unit that performs band limiting by narrowing a band of a signal that changes according to a result of comparison by the comparing unit; and an amplification unit that amplifies the signal whose band has been limited through the band limiting unit. The present technology can be applied to a solid-state imaging apparatus that performs AD conversion in a pixel, for example.

20 Claims, 20 Drawing Sheets

(51) Int. Cl.
  *H04N 5/378*  (2011.01)
  *H01L 27/146*  (2006.01)
  *H04N 5/3745*  (2011.01)

(58) Field of Classification Search
  USPC ....... 348/300, 308, 302, 294, 297, 193, 241,
    348/470, 384.1; 257/291, 292, 443, 293,
    257/593; 250/208.1
  See application file for complete search history.

(56) References Cited

U.S. PATENT DOCUMENTS

2014/0085523 A1* 3/2014 Hynecek ................ H04N 5/235
    348/311
2016/0112660 A1* 4/2016 Nakazawz ............. H04N 5/365
    250/208.1
2017/0318250 A1* 11/2017 Sakakibara ............ H04N 5/378

* cited by examiner

SENSOR ELEMENT AND ELECTRONIC DEVICE

TECHNICAL FIELD

The present disclosure relates to a sensor element and an electronic device, and more particularly, to a sensor element and an electronic device that can further reduce noise.

BACKGROUND ART

Conventionally, among signal readout schemes of a solid-state imaging apparatus, in a case of performing analog to digital (AD) conversion within a limited area such as within a pixel, for example, the scheme with the highest area efficiency is the integrating (slope type) AD conversion scheme including a comparator and subsequent digital circuits.

For example, Patent Document 1 discloses a solid-state imaging apparatus in which elements such as a light receiving section, a transfer section, a charge-voltage comparison section, a latch control section, a latch section, and a signal readout section (repeater) are formed in one pixel, and AD conversion can be performed in the pixel.

CITATION LIST

Patent Document

Patent Document 1: International Patent Application Publication No. 2016/136448

SUMMARY OF THE INVENTION

Problems to be Solved by the Invention

Incidentally, in the solid-state imaging apparatus having the above-described configuration, even if a lamination technology of bonding two or more layers of wafers is applied, for example, a large amount of noise has been generated due to the small area having an area constraint of several μm level or the small current such as a subthreshold current of several nA.

The present disclosure has been made in view of such circumstances, and aims to further reduce noise.

Solutions to Problems

A sensor element of an aspect of the present disclosure includes: a comparing unit that compares a predetermined detection signal with a predetermined reference signal; a band limiting unit that performs band limiting by narrowing a band of a signal that changes according to a result of comparison by the comparing unit; and an amplification unit that amplifies and outputs the signal whose band has been limited through the band limiting unit.

An electronic device of an aspect of the present disclosure includes a sensor element having: a comparing unit that compares a predetermined detection signal with a predetermined reference signal; a band limiting unit that performs band limiting by narrowing a band of a signal that changes according to a result of comparison by the comparing unit; and an amplification unit that amplifies and outputs the signal whose band has been limited through the band limiting unit.

In one aspect of the present disclosure, a predetermined detection signal and a predetermined reference signal are compared, band limitation is performed in which the band of a signal that changes according to the result of the comparison is narrowed, and the band-limited signal is amplified and output.

Effects of the Invention

According to an aspect of the present disclosure, noise can be further reduced.

Note that the effect described herein is not necessarily limited, and the effect may be any of those described in the present disclosure.

MODES FOR CARRYING OUT THE INVENTION

Hereinafter, specific embodiments to which the present technology is applied will be described in detail with reference to the drawings.

Configuration Example of Solid-State Imaging Apparatus

Figure 1:
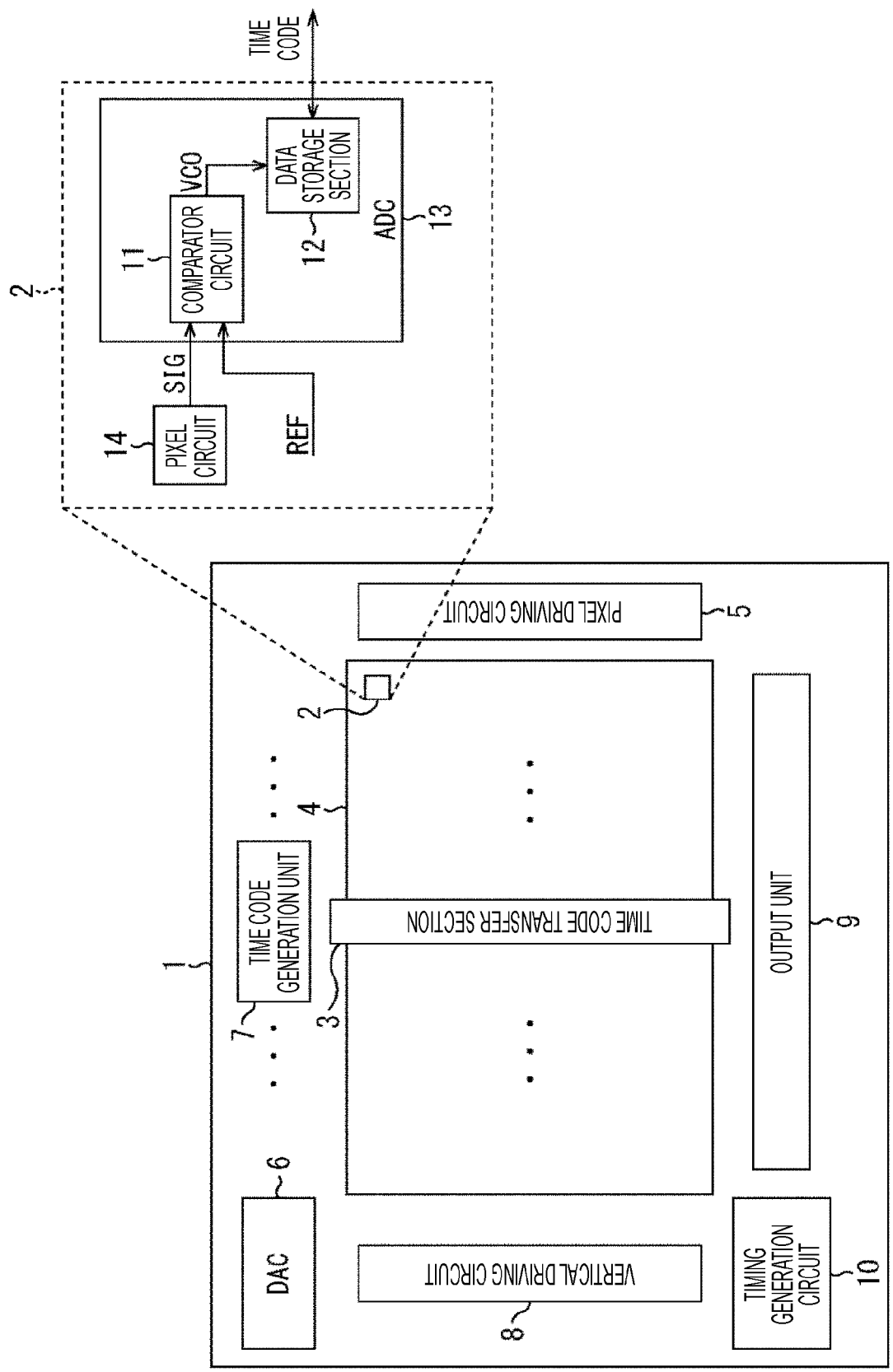
FIG. 1 is a block diagram showing a configuration example of an embodiment of a solid-state imaging device to which the present technology is applied.

FIG. 1 is a block diagram showing a configuration example of an embodiment of a solid-state imaging apparatus to which the present technology is applied.

As shown in FIG. 1, a solid-state imaging apparatus 1 has a pixel array unit 4 in which multiple pixels 2 are arranged in a two-dimensional array on a semiconductor substrate using a semiconductor such as silicon (Si), for example. Moreover, the pixel array unit 4 is also provided with a time code transfer section 3 that transfers a time code generated by a time code generation unit 7 to each pixel 2. Additionally, the solid-state imaging apparatus 1 includes, around the pixel array unit 4, a pixel driving circuit 5, a D/A converter (DAC) 6, the time code generation unit 7, a vertical driving circuit 8, an output unit 9, and a timing generation circuit 10.

As shown in the upper right part of FIG. 1, each of the multiple pixels 2 arranged in a two-dimensional array has an ADC 13 having a comparator circuit 11 and a data storage section 12, and a pixel circuit 14 having a light receiving element (e.g., PD 52 of FIG. 10 described later). For example, in the pixel 2, a charge signal corresponding to the amount of light received by the light receiving element is output from the pixel circuit 14, and the charge signal is converted from an analog pixel signal SIG into a digital pixel signal SIG and output by the ADC 13.

The pixel driving circuit 5 drives the pixel circuit 14 in the pixel 2. The DAC 6 generates a reference signal (reference voltage signal) REF, which is a slope signal whose level (voltage) monotonously decreases with time, and supplies the reference signal REF to each pixel 2.

The time code generation unit 7 generates a time code used when each pixel 2 converts an analog pixel signal SIG into a digital signal (AD conversion), and supplies the time code to the corresponding time code transfer section 3. Multiple time code generation units 7 are provided for the pixel array unit 4, and the number of time code transfer sections 3 provided in the pixel array unit 4 is equal to the number of the time code generation units 7. That is, there is a one-to-one correspondence between the time code generation unit 7 and the time code transfer section 3 that transfers the time code generated by the time code generation unit 7.

The vertical driving circuit 8 performs control to output the digital pixel signal SIG generated in the pixel 2 to the output unit 9 in a predetermined order on the basis of timing signals supplied from the timing generation circuit 10. The digital pixel signal SIG output from the pixel 2 is output from the output unit 9 to the outside of the solid-state imaging apparatus 1. The output unit 9 performs predetermined digital signal processing, such as black level correction processing for correcting the black level and correlated double sampling (CDS) processing, as necessary, and then outputs the digital signal to the outside.

The timing generation circuit 10 includes a timing generator or the like that generates various timing signals, and supplies the generated various timing signals to the pixel driving circuit 5, the DAC 6, the vertical driving circuit 8, and the like.

The solid-state imaging apparatus 1 is configured as described above. Note that while all the circuits included in the solid-state imaging apparatus 1 in FIG. 1 described above are formed on one semiconductor substrate, it is also possible to arrange the circuits included in the solid-state imaging apparatus 1 separately on multiple semiconductor substrates, for example.

Here, the operation of the pixel 2 will be described.

In the pixel 2, a charge signal corresponding to the amount of light received by the light receiving element is output from the pixel circuit 14 to the ADC 13 as an analog pixel signal SIG, and is converted into a digital pixel signal SIG by AD conversion and output by the ADC 13.

In the ADC 13, the comparator circuit 11 compares the reference signal REF supplied from the DAC 6 with the pixel signal SIG, and outputs an output signal VCO as a comparison result signal indicating a comparison result. For example, the comparator circuit 11 inverts the output signal VCO when the reference signal REF and the pixel signal SIG become the same (voltage).

In addition to the output signal VCO from the comparator circuit 11, the data storage section 12 receives, from the vertical driving circuit 8, a WR signal (hereinafter also referred to as write control signal WR) indicating a pixel signal write operation, an RD signal (hereinafter also referred to as read control signal RD) indicating a pixel signal read operation, and a WORD signal for controlling the read timing of the pixel 2 during a pixel signal read operation. Additionally, the data storage section 12 also receives a time code generated by the time code generation unit 7 through the time code transfer section 3. Note that here, in order to facilitate understanding of the operation of the pixel 2, it is described that the vertical driving circuit 8 generates a control signal and supplies it to the pixel array unit 4. However, a circuit (not shown) that generates a control signal for driving all pixels simultaneously may be arranged on a horizontal portion, for example. That is, as long as the control signal is supplied to the pixel array unit 4, the arrangement of the circuit that generates the control signal is not limited.

For example, the data storage section 12 includes a latch control circuit (e.g., input/output control unit 30 of FIG. 9 described later) that controls a write operation and a read operation of the time code on the basis of a WR signal and an RD signal, and a latch storage unit (e.g., signal storage unit 31 of FIG. 9 described later) that stores a time code.

In the time code write operation, the latch control circuit stores the time code, which is supplied from the time code transfer section 3 and updated for each unit time, in the latch storage unit while the Hi (High) output signal VCO is input from the comparator circuit 11. Then, when the reference signal REF and the pixel signal SIG become the same (voltage) and the output signal VCO supplied from the comparator circuit 11 is inverted to Lo (Low), writing (updating) of the time code supplied is stopped, and the time code most recently stored in the latch storage unit is held in the latch storage unit. The time code stored in the latch storage unit indicates a time when the pixel signal SIG and the reference signal REF became equal, and represents data indicating that the pixel signal SIG was the reference voltage at that time, that is, represents a digitized light value.

After the sweep of the reference signal REF is completed and the time codes are stored in the latch storage units of all the pixels 2 in the pixel array unit 4, the operation of the pixel 2 is changed from the write operation to the read operation.

In the time code read operation, the latch control circuit outputs, to the time code transfer section 3, the time code (digital pixel signal SIG) stored in the latch storage unit when the pixel 2 comes to its own read timing, on the basis of the WORD signal that controls the read timing. The time code transfer section 3 sequentially transfers the supplied time codes in the column direction (vertical direction) and supplies the time codes to the output unit 9.

In the following, in order to distinguish from the time code written in the latch storage unit in a time code write operation, digitized pixel data indicating that the pixel signal SIG was the reference voltage at that time, which is an inverted time code when the output signal VCO read from the latch storage unit is inverted in a time code read operation, is also referred to as AD conversion pixel data.

First Configuration Example of Comparator Circuit

Figure 2:
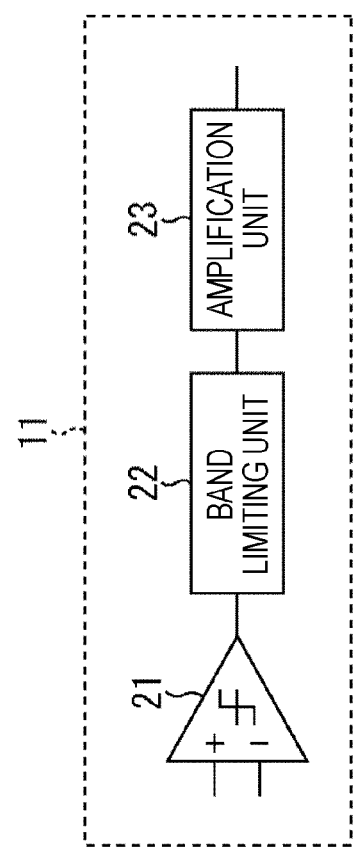
FIG. 2 is a block diagram showing a first configuration example of a comparator circuit.

FIG. 2 is a block diagram showing a first configuration example of the comparator circuit 11.

As shown in FIG. 2, the comparator circuit 11 includes a comparator 21, a band limiting unit 22, and an amplification unit 23.

In the comparator 21, the analog pixel signal SIG output from the pixel circuit 14 in the pixel 2 of FIG. 1 is input to the − input terminal, and the reference signal REF output from the DAC 6 is input to the + input terminal. Then, the comparator 21 compares the analog pixel signal SIG with the reference signal REF, and outputs a predetermined current as an output signal when the analog pixel signal SIG is higher than the reference signal REF.

The band limiting unit 22 limits the band of the output signal output from the comparator 21. For example, the band limiting unit 22 can be implemented by a capacitor 63 shown in FIG. 10 described later or a transistor 111 shown in FIG. 11 described later.

The amplification unit 23 amplifies the output signal of the comparator 21 band-limited by the band limiting unit 22, and supplies the output signal VCO as a comparison result signal indicating the comparison result of the comparator circuit 11 to the data storage section 12 of FIG. 1, for example.

The comparator circuit 11 is configured as described above, and the band limiting unit 22 can limit the band of the comparison result signal output from the comparator 21. As a result, it is possible to reduce the noise of the output signal by band limitation in the comparator circuit 11.

Second Configuration Example of Comparator Circuit

Figure 3:
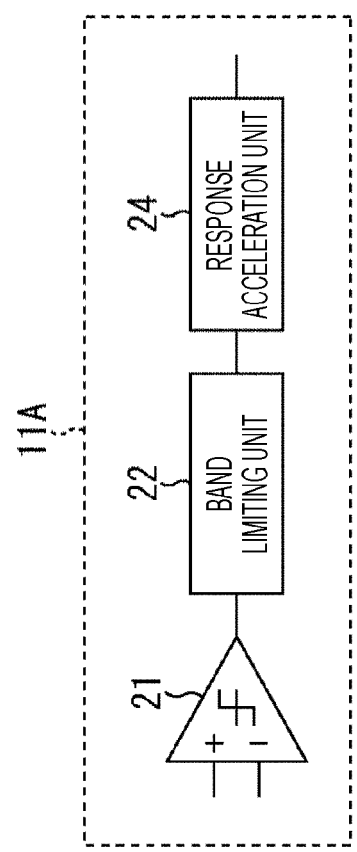
FIG. 3 is a block diagram showing a second configuration example of a comparator circuit.

FIG. 3 is a block diagram showing a second configuration example of the comparator circuit 11. Note that in a comparator circuit 11A shown in FIG. 3, blocks common to the configuration of the comparator circuit 11 in FIG. 2 are assigned the same reference numerals, and detailed description thereof will be omitted.

That is, as shown in FIG. 3, the comparator circuit 11A includes a comparator 21, a band limiting unit 22, and a response acceleration unit 24. That is, the comparator circuit 11A includes the response acceleration unit 24 instead of the amplification unit 23 of the comparator circuit 11 in FIG. 1.

A positive feedback circuit that feeds back part of the output and adds it to the input can be used as the response acceleration unit 24, for example. Accordingly, the response acceleration unit 24 can accelerate the response to the output signal output from the comparator 21.

The comparator circuit 11A configured as described above can reduce noise similarly to the case of the comparator circuit 11 of FIG. 2, and can accelerate the response to an output signal.

Incidentally, the comparator circuit 11 of FIG. 2 and the comparator circuit 11A of FIG. 3 are not limited to use in the pixel 2 in the solid-state imaging apparatus 1 as shown in FIG. 1. That is, when detecting various physical quantities, the comparator circuit 11 of FIG. 2 and the comparator circuit 11A of FIG. 3 can be used for comparing a detection signal of the physical quantity and the reference signal REF, for example.

Configuration Example of Physical Quantity Detection Unit

Figure 4:
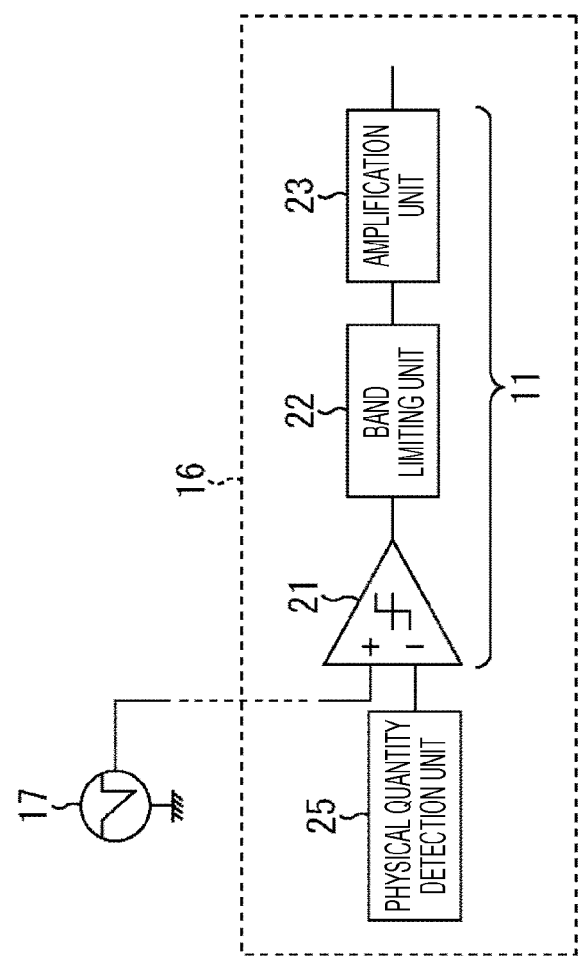
FIG. 4 is a block diagram showing a configuration example of a physical quantity detection circuit.

FIG. 4 is a block diagram showing a configuration example of a physical quantity detection circuit 16 using the comparator circuit 11 described with reference to FIG. 2.

As shown in FIG. 4, the physical quantity detection circuit 16 includes the comparator circuit 11 and a physical quantity detection unit 25, and is connected to a reference signal generation unit 17 that generates the reference signal REF similar to that generated by the DAC 6 in FIG. 1.

The physical quantity detection unit 25 detects various physical quantities other than the light quantity, and outputs an analog detection signal corresponding to the physical quantity similarly to the pixel circuit 14 of FIG. 1.

In the comparator circuit 11, the reference signal REF output from the reference signal generation unit 17 is input to the + input terminal of the comparator 21, and the analog detection signal output from the physical quantity detection unit 25 is input to the − input terminal of the comparator 21. Then, the comparator circuit 11 can output a comparison result signal indicating the result of comparison between the detection signal and the reference signal REF as the output signal VCO. At this time, in the comparator circuit 11, the band limiting unit 22 band-limits the output signal of the comparator 21.

Accordingly, the physical quantity detection circuit 16 can reduce noise by band limitation in a similar manner as described with reference to FIG. 2.

For example, it is possible to form a sensor capable of detecting a physical quantity in a linear manner by arranging the physical quantity detection circuit 16 one-dimensionally, or to form a sensor capable of detecting a physical quantity in a planar manner by arranging the physical quantity detection circuit 16 two-dimensionally. As described above, the sensor including such a physical quantity detection circuit 16 can reduce noise by band limitation.

First Configuration Example of Pixel

Figure 5:
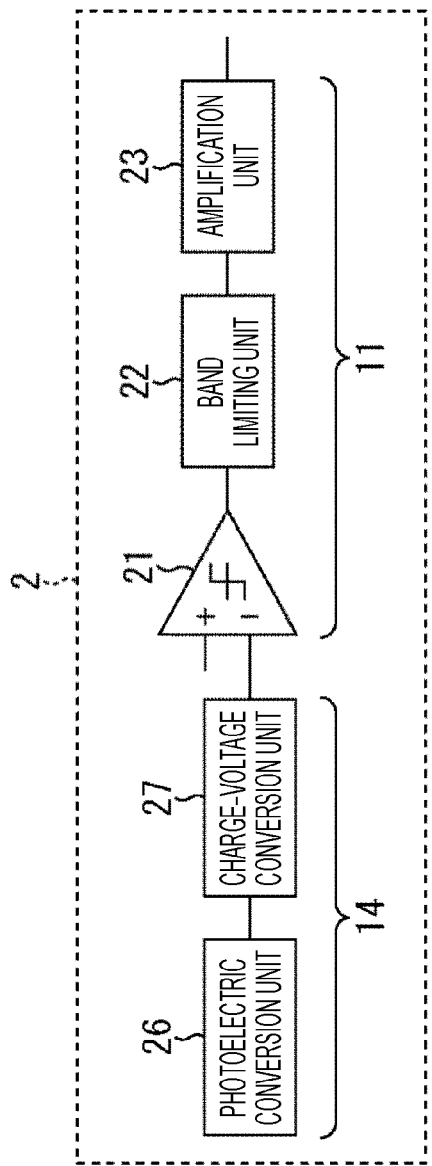
FIG. 5 is a block diagram showing a first configuration example of a pixel.

FIG. 5 is a block diagram showing a first configuration example of the pixel 2 using the comparator circuit 11 described with reference to FIG. 2.

As shown in FIG. 5, the pixel 2 includes the comparator circuit 11 and the pixel circuit 14, and also includes the data storage section 12 (not shown) (see FIG. 1). Additionally, similar to the comparator circuit 11 of FIG. 2, the comparator circuit 11 includes the comparator 21, the band limiting unit 22, and the amplification unit 23, and detailed description thereof will be omitted.

The pixel circuit 14 has a photoelectric conversion unit 26 and a charge-voltage conversion unit 27. The photoelectric conversion unit 26 includes a light receiving element (e.g., PD 52 of FIG. 10 described later) that photoelectrically converts received light into charges and accumulates the charges, for example. The charge-voltage conversion unit 27 includes a floating diffusion region and an amplification transistor (e.g., FD unit 54 and amplification transistor 55 of FIG. 10 described later) that convert the charge accumulated in the photoelectric conversion unit 26 into a voltage for input to the comparator 21.

The pixel 2 is configured as described above. In the pixel circuit 14, the charge generated by the photoelectric conversion in the photoelectric conversion unit 26 is converted into a voltage by the charge-voltage conversion unit 27 and input to the − input terminal of the comparator 21 included in the comparator circuit 11. Then, in the comparator circuit 11, the reference signal REF output from the DAC 6 is input to the + input terminal of the comparator 21.

Accordingly, in the pixel 2 configured as described above, the comparator circuit 11 can reduce the noise of the output signal by band limitation as described above.

Second Configuration Example of Pixel

Figure 6:
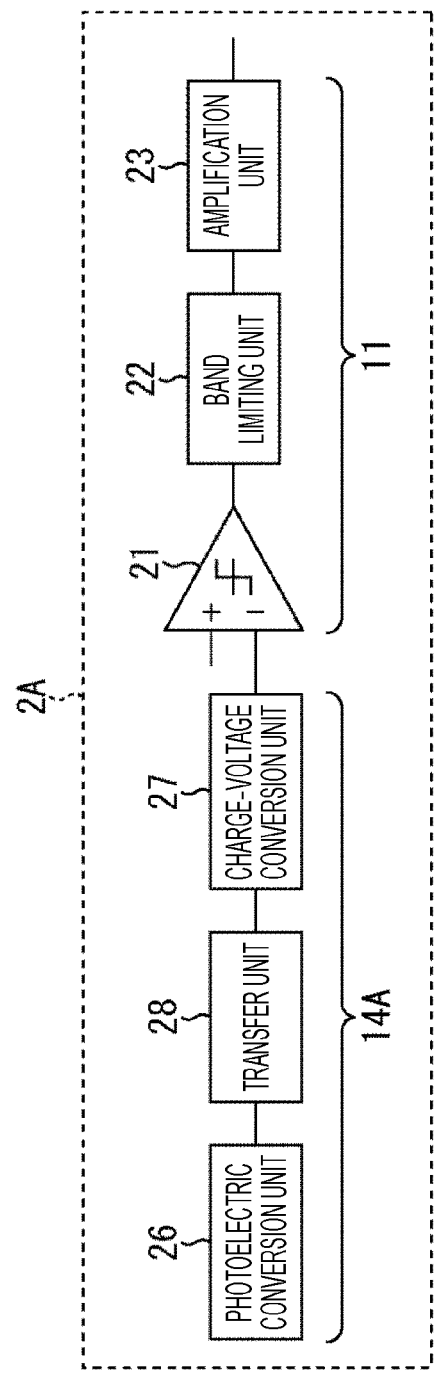
FIG. 6 is a block diagram showing a second configuration example of a pixel.

FIG. 6 is a block diagram showing a second configuration example of the pixel 2 using the comparator circuit 11 described with reference to FIG. 2. Note that in a pixel 2A shown in FIG. 6, blocks common to the configuration of the pixel 2 in FIG. 5 are assigned the same reference numerals, and detailed description thereof will be omitted.

That is, the pixel 2A shown in FIG. 6 includes the comparator circuit 11 and a pixel circuit 14A. Then, the configuration of the pixel 2A is the same as that of the pixel 2 of FIG. 5 in that the comparator circuit 11 has the comparator 21, the band limiting unit 22, and the amplification unit 23, and the pixel circuit 14A has the photoelectric conversion unit 26 and the charge-voltage conversion unit 27.

On the other hand, the configuration of the pixel 2A is different from that of the pixel 2 of FIG. 5 in that the pixel circuit 14A has a transfer unit 28 between the photoelectric conversion unit 26 and the charge-voltage conversion unit 27. That is, in the pixel 2 of FIG. 2, the photoelectric conversion unit 26 is directly connected to the charge-voltage conversion unit 27, whereas in the pixel 2A, the photoelectric conversion unit 26 is connected to the charge-voltage conversion unit 27 through the transfer unit 28.

The transfer unit 28 includes a transfer transistor (e.g., transfer transistor 53 of FIG. 10 described later) for transferring the charges accumulated by the photoelectric conversion in the photoelectric conversion unit 26 to the charge-voltage conversion unit 27 at a predetermined timing.

In the pixel 2A configured as described above, too, the comparator circuit 11 can reduce the noise of the output signal by band limitation as described above.

Third Configuration Example of Pixel

Figure 7:
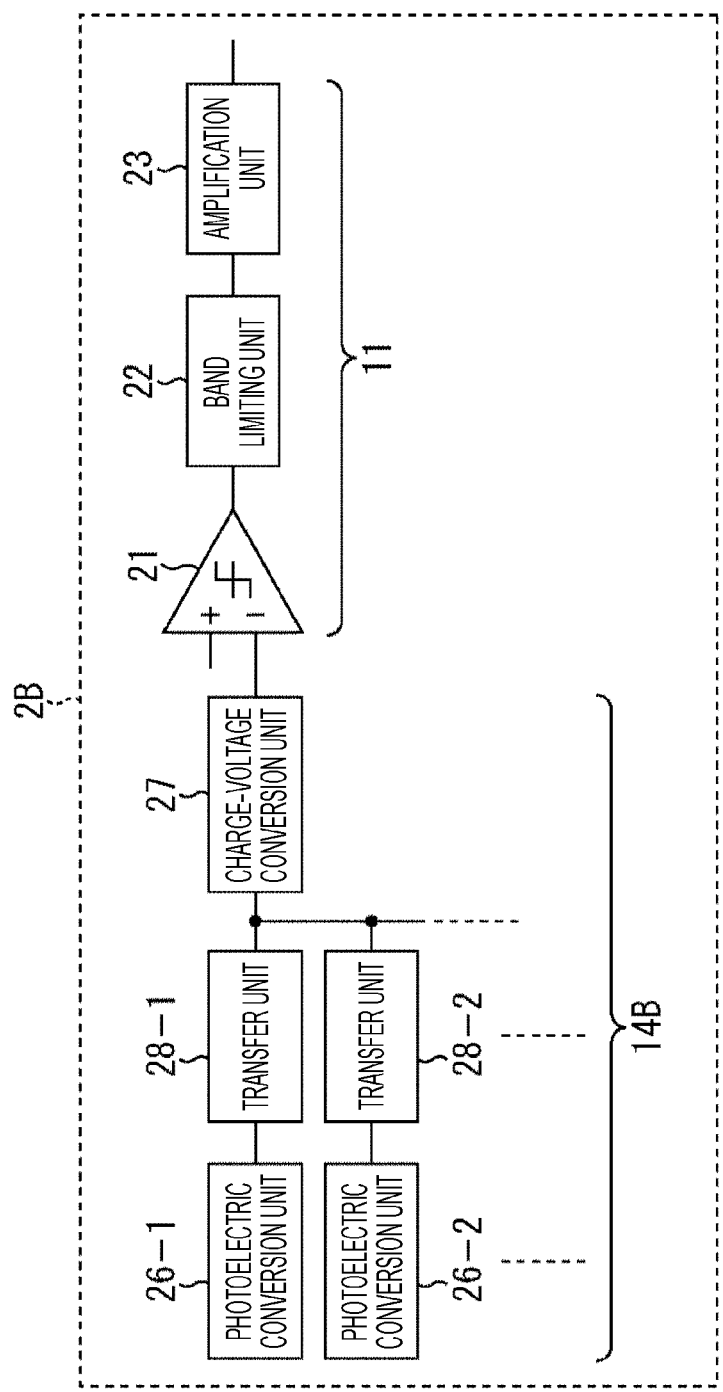
FIG. 7 is a block diagram showing a third configuration example of a pixel.

FIG. 7 is a block diagram showing a third configuration example of the pixel 2 using the comparator circuit 11 described with reference to FIG. 2. Note that in a pixel 2B shown in FIG. 7, blocks common to the configuration of the pixel 2 in FIG. 5 are assigned the same reference numerals, and detailed description thereof will be omitted.

That is, the pixel 2B shown in FIG. 7 includes the comparator circuit 11 and a pixel circuit 14B. Then, the configuration of the pixel 2B is the same as that of the pixel 2 of FIG. 5 in that the comparator circuit 11 has the comparator 21, the band limiting unit 22, and the amplification unit 23, and the pixel circuit 14 has the charge-voltage conversion unit 27.

On the other hand, the configuration of the pixel 2B is different from that of the pixel 2 of FIG. 5 in that the pixel 2B has a predetermined number of photoelectric conversion units 26 and a predetermined number of transfer units 28, and each of the photoelectric conversion units 26 is connected to the same charge-voltage conversion unit 27 through the transfer unit 28. That is, the pixel 2B employs an FD sharing structure in which a predetermined number of photoelectric conversion units 26 share the charge-voltage conversion unit 27.

In the pixel 2B configured as described above, too, the comparator circuit 11 can reduce the noise of the output signal by band limitation as described above.

Fourth Configuration Example of Pixel

Figure 8:
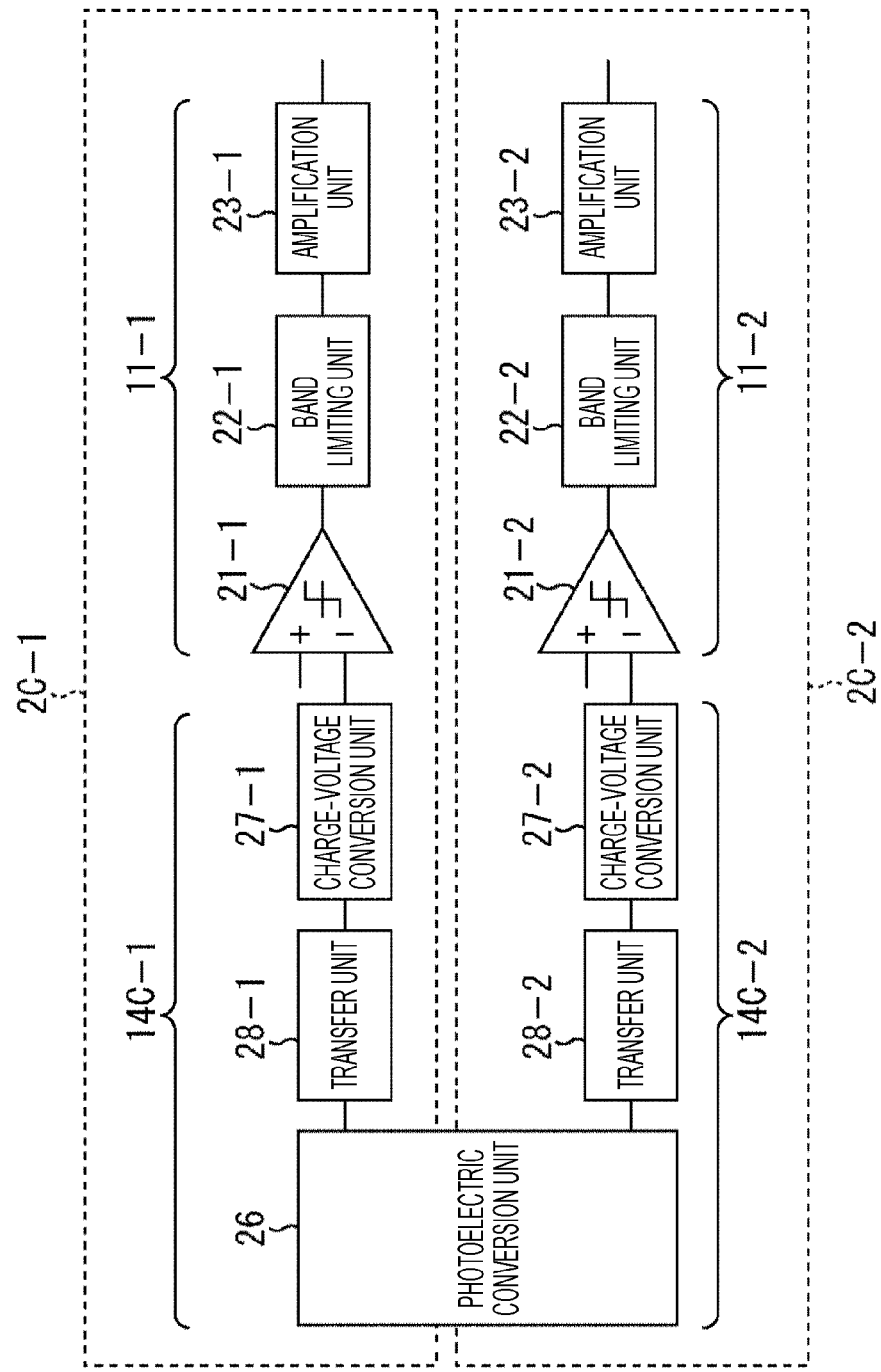
FIG. 8 is a block diagram showing a fourth configuration example of a pixel.

FIG. 8 is a block diagram showing a fourth configuration example of the pixel 2 using the comparator circuit 11 described with reference to FIG. 2. Note that in a pixel 2C shown in FIG. 8, blocks common to the configuration of the pixel 2 in FIG. 5 are assigned the same reference numerals, and detailed description thereof will be omitted.

As shown in FIG. 8, two pixels 2C-1 and 2C-1 employ a PD sharing structure in which one photoelectric conversion unit 26 is shared. That is, the charges photoelectrically converted by the photoelectric conversion unit 26 are supplied to a charge-voltage conversion unit 27-1 through a transfer unit 28-1 on the pixel 2C-1 side, and are supplied to a charge-voltage conversion unit 27-2 through a transfer unit 28-2 on the pixel 2C-2 side.

In the pixel 2C configured as described above, too, the comparator circuit 11 can reduce the noise of the output signal by band limitation as described above.

Fifth Configuration Example of Pixel

Figure 9:
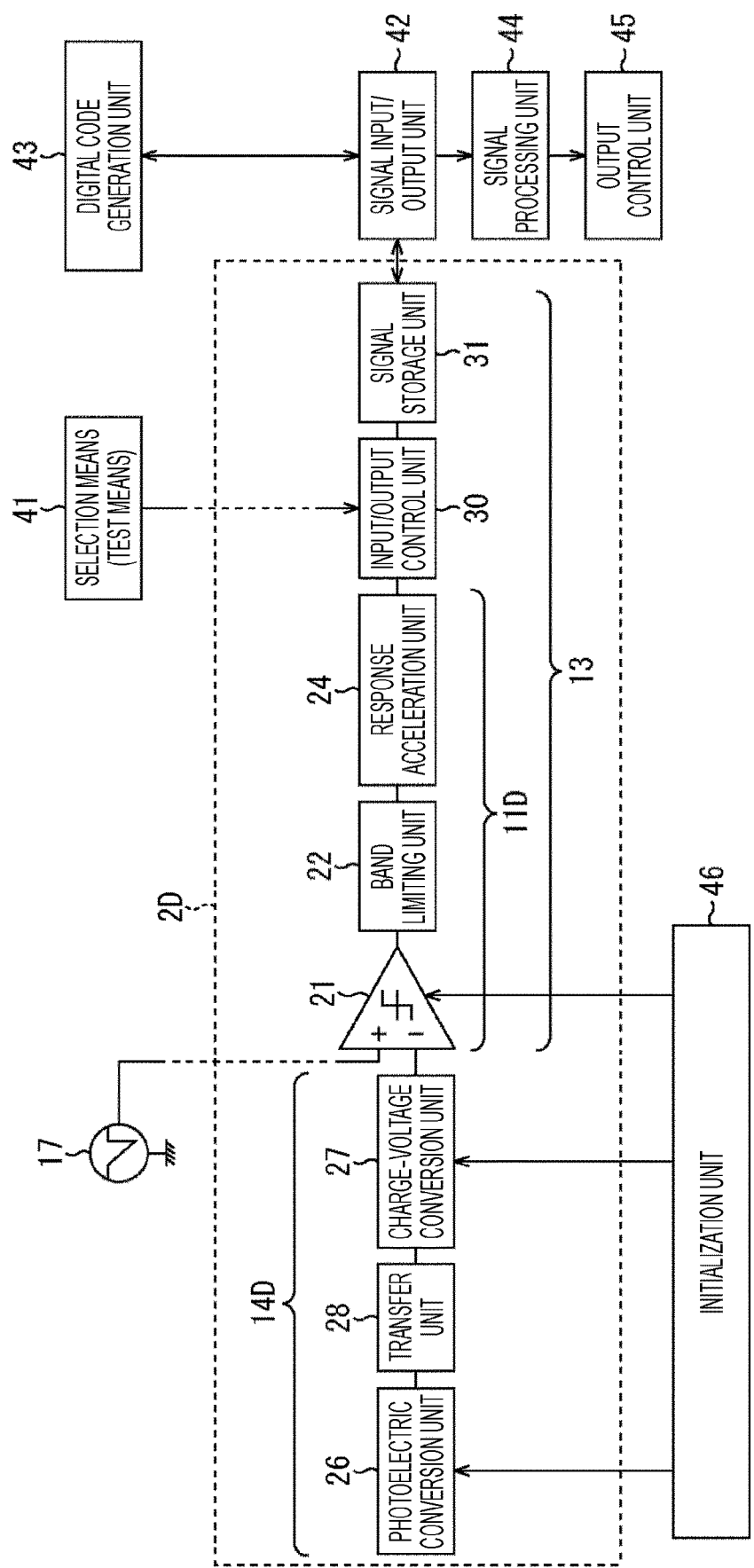
FIG. 9 is a block diagram showing a fifth configuration example of a pixel.

FIG. 9 is a block diagram showing a fifth configuration example of the pixel 2 using the comparator circuit 11 described with reference to FIG. 2. Note that in a pixel 2D shown in FIG. 9, blocks common to the configuration of the comparator circuit 11A in FIG. 3, the pixel 2 in FIG. 5, and the pixel 2A in FIG. 6 are assigned the same reference numerals, and detailed description thereof will be omitted. Here, the pixel 2D is a best configuration example having one photoelectric conversion unit 26 and one transfer unit 28.

As shown in FIG. 9, the pixel 2D includes a comparator circuit 11D, a pixel circuit 14D, the input/output control unit 30, and the signal storage unit 31.

Similar to the comparator circuit 11A of FIG. 3, the comparator circuit 11D has the comparator 21, the band limiting unit 22, and the response acceleration unit 24, and similar to the pixel circuit 14A of FIG. 6, the pixel circuit 14D has the photoelectric conversion unit 26, the charge-voltage conversion unit 27, and the transfer unit 28. Additionally, the input/output control unit 30 and the signal storage unit 31 correspond to the data storage section 12 of FIG. 1, and the ADC 13 (FIG. 1) includes the comparator circuit 11D, the input/output control unit 30, and the signal storage unit 31.

Additionally, the input/output control unit 30 controls input/output according to the selection by selection means 41 (test means), and the signal storage unit 31 exchanges signals with a signal input/output unit 42 corresponding to the time code transfer section 3 of FIG. 1. The signal input/output unit 42 is supplied with a digital time code from a digital code generation unit 43 corresponding to the time code generation unit 7 of FIG. 1, and the signal output to the signal input/output unit 42 from the signal storage unit 31 is output through a signal processing unit 44 and an output control unit 45 corresponding to the output unit 9 of FIG. 1. Additionally, the photoelectric conversion unit 26, the charge-voltage conversion unit 27, and the comparator 21 can be initialized (reset) by initialization means 46.

First Circuit Configuration Example of Pixel

Figure 10:
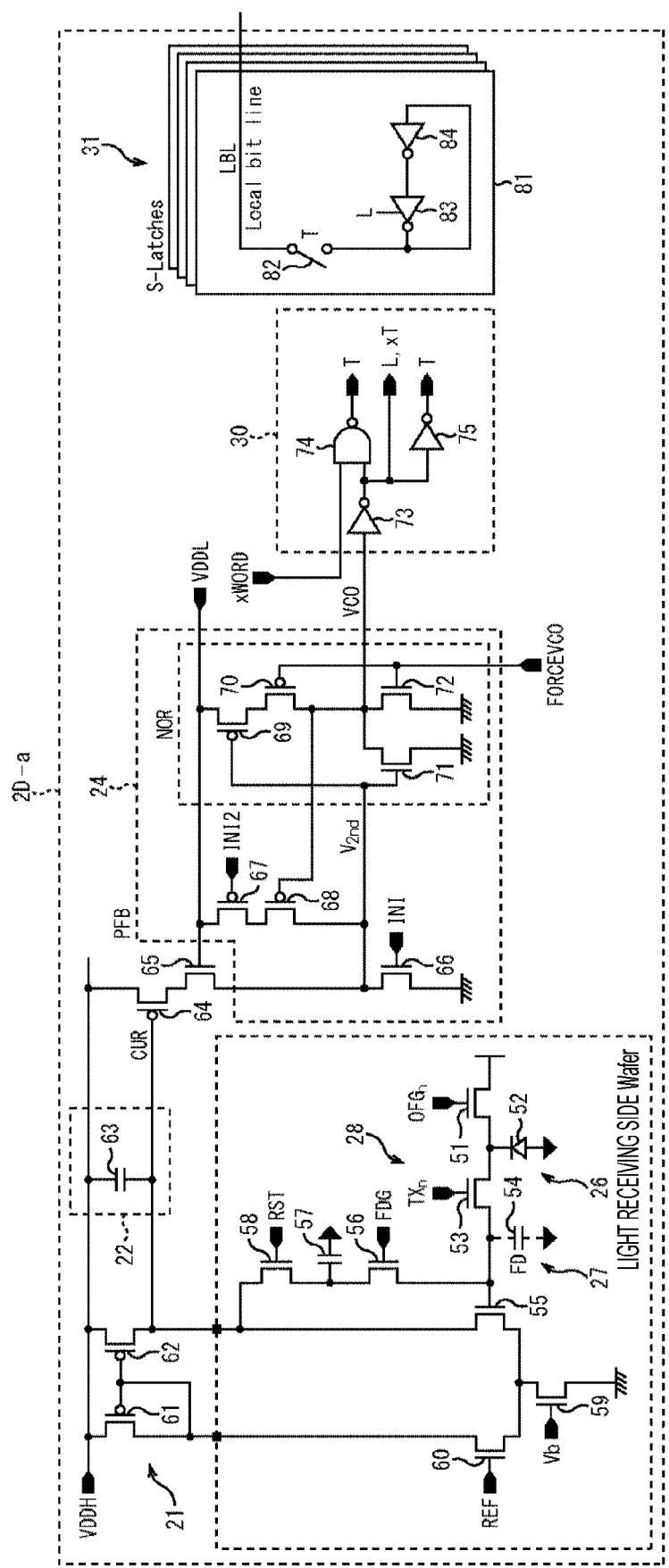
FIG. 10 is a diagram showing a first circuit configuration example of the pixel shown in FIG. 9.

FIG. 10 is a diagram showing a first circuit configuration of the pixel 2D shown in FIG. 9.

A pixel 2D-a shown in FIG. 10 has a circuit configuration in which the band limiting unit 22 is implemented by the capacitor 63.

As shown in FIG. 10, the pixel 2D-a includes, on a light receiving side wafer, a discharge transistor 51, a photodiode (PD) 52, the transfer transistor 53, a floating diffusion (FD) unit 54, the amplification transistor 55, a connection transistor 56, a capacitor 57, a reset transistor 58, and transistors 59 and 60. Additionally, the pixel 2D-a includes, on a logic circuit wafer, transistors 61 and 62, the capacitor 63, transistors 64 to 72, an inverter 73, a NAND circuit 74, an inverter 75, and the signal storage unit 31 including multiple one-bit latches 81.

The PD 52 corresponds to the photoelectric conversion unit 26 of FIG. 9, for example, and the discharge transistor 51 discharges the charges accumulated in the PD 52. The transfer transistor 53 corresponds to the transfer unit 28 of FIG. 9, and transfers charges from the PD 52 to the FD unit 54. The FD unit 54 and the amplification transistor 55 are included in the charge-voltage conversion unit 27 of FIG. 9. The connection transistor 56 connects the capacitor 57 to the FD unit 54, and the charges accumulated in the FD unit 54 are reset through the reset transistor 58.

An input bias current Vb is supplied to the transistor 59, and the reference signal REF is supplied to the transistor 60. The transistor 60 forms a differential pair with the amplification transistor 55. Additionally, the transistors 61 and 62 form a current mirror, and are included in the comparator 21 of FIG. 9.

Then, the capacitor 63 is included in the band limiting unit 22 of FIG. 9, and is a circuit capacitor 63 provided between a line for supplying an H-level drain power VDDH and a line for outputting an output signal from the comparator 21.

Additionally, the transistors 66 to 72 form a positive feedback circuit (PFB) serving as the response acceleration unit 24 of FIG. 9, and the response acceleration unit 24 has a NOR circuit including the transistors 69 to 72. The inverter 73, the NAND circuit 74, and the inverter 75 are included in the input/output control unit 30 of FIG. 9. Additionally, the signal storage unit 31 of FIG. 9 includes the number of latches 81 corresponding to the required bit length, and each latch 81 includes a switch 82 and inverters 83 and 84.

In the pixel 2D configured as described above, in order to effectively reduce noise by band limitation by the capacitor 63, it is desirable to provide the capacitor 63 at the output of the first stage as shown in FIG. 10. For example, the capacitor 63 may include a metal wiring or a poly-diffusion MOS type.

The leakage current of the transistor (NMOS) 66 to which the INI control signal is connected is designed to be larger than the leakage current of both the transistor (PMOS) 64 to which the second-stage input CUR is connected and the transistor (PMOS) 68 that is connected in series with the transistor 67 to which the INI2 control signal is connected and receives positive feedback. This is because if the leakage amount of the transistor (NMOS) 66 is smaller than the leakage amount of the transistors (PMOS) 64 and 68, the floating portion indicated by V2nd in FIG. 10 is unintentionally inverted due to the current difference, regardless of the input signal (here, input CUR of second stage).

For this reason, the transistor (NMOS) 66 controlled by the INI inevitably uses a transistor that has a larger leakage amount than the leakage current flowing from the paths of the transistors (PMOS) 64 and 68 and whose threshold is adjusted. Hence, an output resistance R is inevitably low. Increasing the output resistance R is equivalent to facilitating unintended inversion. For this reason, it is difficult to narrow the band by improving the output resistance R. Accordingly, it is preferable to provide the capacitor 63 at the output of the first stage and limit the band there. Note that a capacitor (not shown) serving as the band limiting unit 22 may be provided in the floating unit indicated by V2nd in FIG. 10 instead of at the first stage.

Second Circuit Configuration Example of Pixel

Figure 11:
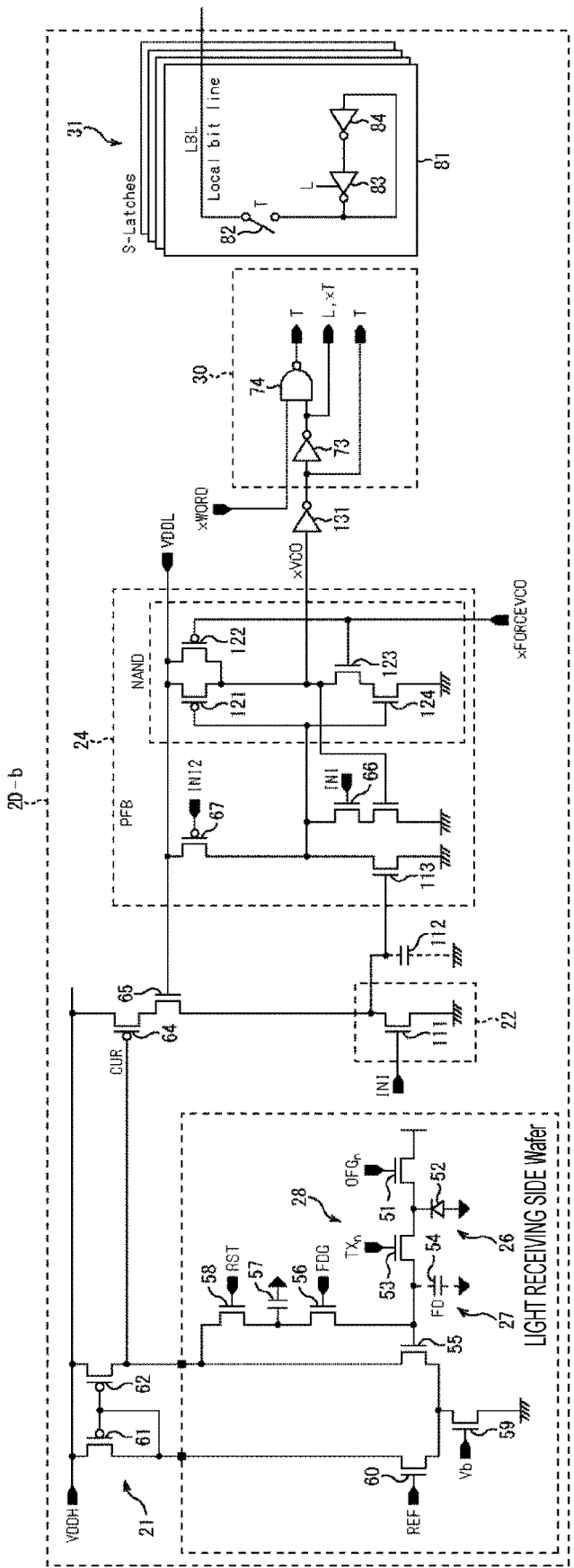
FIG. 11 is a diagram showing a second circuit configuration example of the pixel shown in FIG. 9.

FIG. 11 is a diagram showing a second circuit configuration of the pixel 2D shown in FIG. 9.

A pixel 2D-b shown in FIG. 11 has a circuit configuration in which the band limiting unit 22 is implemented using the output resistance R of the transistor 111. Note that in the pixel 2D-b shown in FIG. 11, configurations common to those of the pixel 2D-a in FIG. 10 are assigned the same reference numerals, and detailed description thereof will be omitted.

That is, in the pixel 2D-b, the band limiting unit 22 includes the transistor 111 provided between the transistor 65 connected in series with the transistor (PMOS) 64 to which the second-stage input CUR is connected, and the ground level. Additionally, a capacitor 112 is provided between the drain terminal of the transistor 111 and the ground level.

Additionally, the response acceleration unit 24 includes a positive feedback circuit (PFB) including transistors 67, 66, 113, and 121 to 124, and the response acceleration unit 24 has a NAND circuit including the transistors 121 to 124. Then, an inverter 131 is arranged between the response acceleration unit 24 and the input/output control unit 30.

Here, in the pixel 2D-a of FIG. 10 described above, the leakage paths of the two transistors (PMOS) 64 and 68 are connected to the one transistor (NMOS) 66 of the INI connection. To prevent erroneous inversion due to leakage, it has been difficult to reduce the output resistance R of the transistor (NMOS) 66.

Hence, in the pixel 2D-b, the output resistance R of one INI-connected transistor (NMOS) 111 can be increased by providing one path for the transistor (PMOS) 64.

For example, in the pixel 2D-a of FIG. 10 described above, the two transistors (PMOS) 64 and 68 use a high-voltage transistor on the side to which CUR is input, and use a low-voltage transistor on the feedback side. Generally, the leakage on the feedback side is more dominant since leakage is larger on the low voltage transistor.

On the other hand, as shown in FIG. 11, the pixel 2D-b includes only the leakage current path of the high voltage PMOS transistor 64. Hence, the resistance value of the NMOS transistor 111 covering the leakage current can be increased by at least one order of magnitude compared to the configuration of the pixel 2D-a of FIG. 10. This means that, in the pixel 2D-b, the band of the comparator 21 can be narrowed by an order of magnitude, and noise can be reduced.

Circuit Configuration Example of Signal Input/Output Unit

Figure 12:
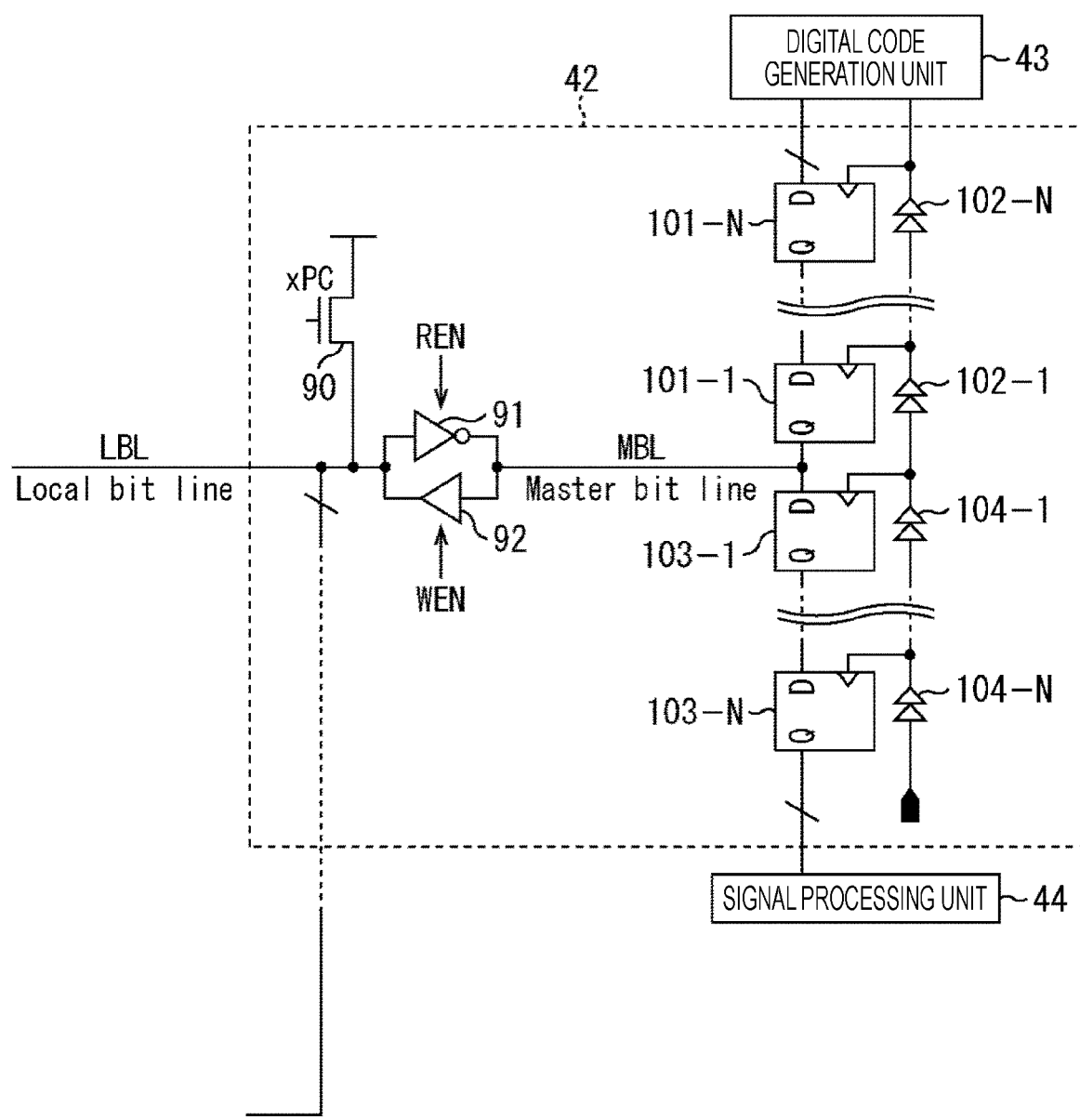
FIG. 12 is a diagram showing a circuit configuration of a signal input/output unit.

FIG. 12 is a diagram showing a circuit configuration of the signal input/output unit 42 shown in FIG. 9.

As shown in FIG. 12, the signal input/output unit 42 includes a transistor 90, a tri-state inverter 91, a tri-state buffer 92, FF circuits 101-1 to 101-N, buffer circuits 102-1 to 102-N, FF circuits 103-1 to 103-N, and buffer circuits 104-1 to 104-N connected to one another. Here, one set of the FF circuit and the buffer circuit is provided for each latch 81 included in the signal storage unit 31, and multiple sets of the FF circuit and the buffer circuit are provided according to the bit length required for the signal storage unit 31.

Figure 13:
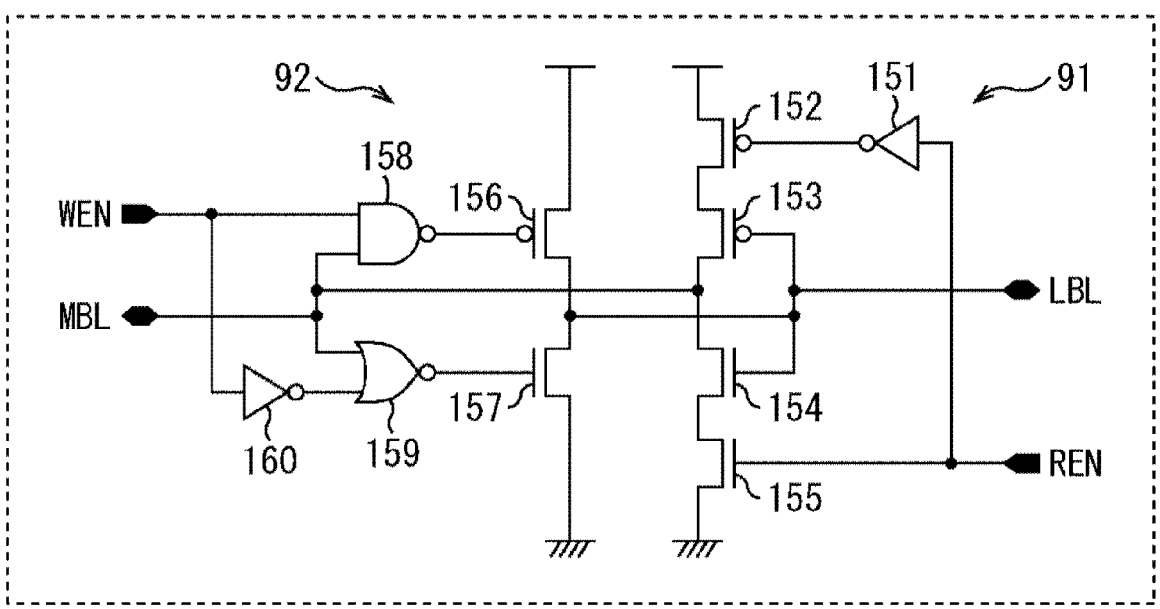
FIG. 13 is a diagram showing a transistor-level circuit configuration of a preceding stage of the signal input/output unit.

FIG. 13 is a diagram showing a transistor-level circuit configuration of the tri-state inverter 91 and the tri-state buffer 92 included in a preceding stage of the signal input/output unit 42 shown in FIG. 12.

As shown in FIG. 13, the tri-state inverter 91 and the tri-state buffer 92 are formed by connecting an inverter 151, transistors 152 to 157, a NAND circuit 158, a NOR circuit 159, and an inverter 160.

Figure 14:
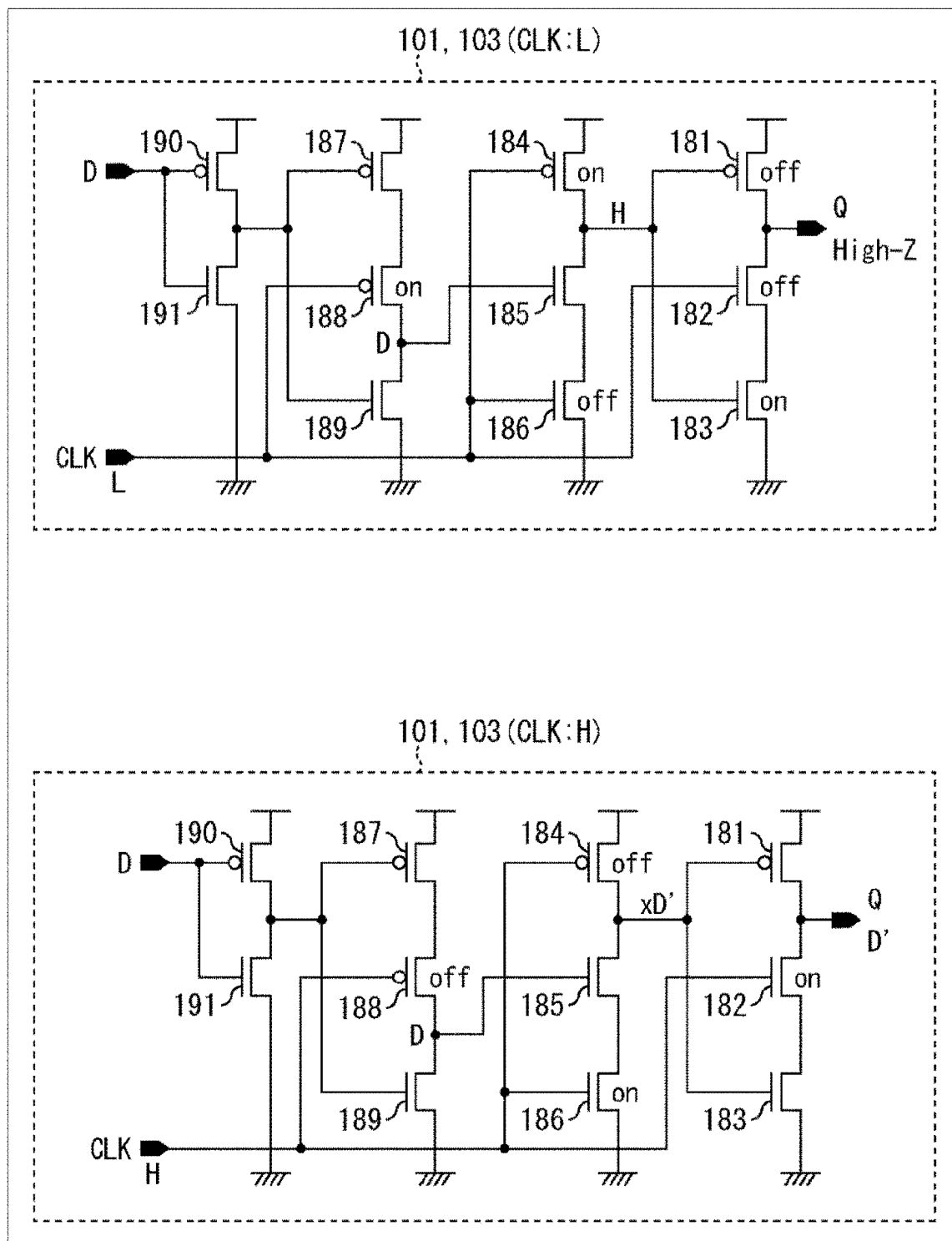
FIG. 14 is a diagram showing a transistor-level circuit configuration of an FF circuit.

FIG. 14 is a diagram showing a transistor-level circuit configuration of the FF circuits 101 and 103 shown in FIG. 12. Additionally, the upper part of FIG. 14 shows the internal states of the FF circuits 101 and 103 when a clock CLK is set to L, and the lower part of FIG. 14 shows the internal states of the FF circuits 101 and 103 when the clock CLK is set to H.

As shown in FIG. 14, the FF circuits 101 and 103 are formed by connecting transistors 181 to 191.

Latch Circuit Configuration Example

Figure 15:
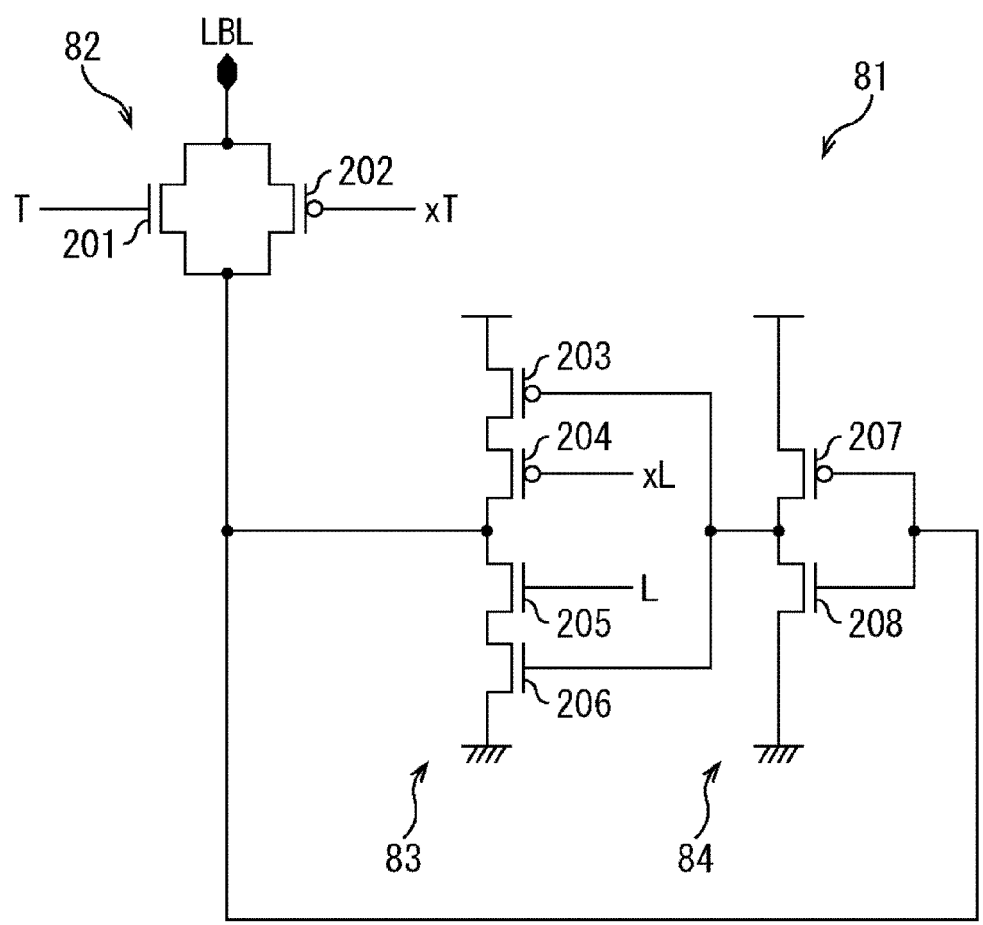
FIG. 15 is a diagram showing a transistor-level circuit configuration of a one-bit latch.

FIG. 15 is a diagram showing a transistor-level circuit configuration of the one-bit latch 81 shown in FIGS. 10 and 11.

As shown in FIG. 15, the one-bit latch 81 is formed by connecting transistors 201 and 202 included in the switch 82, transistors 203 to 206 included in the inverter 83, and transistors 207 and 208 included in the inverter 84.

Example of Driving Waveform

Figure 16:
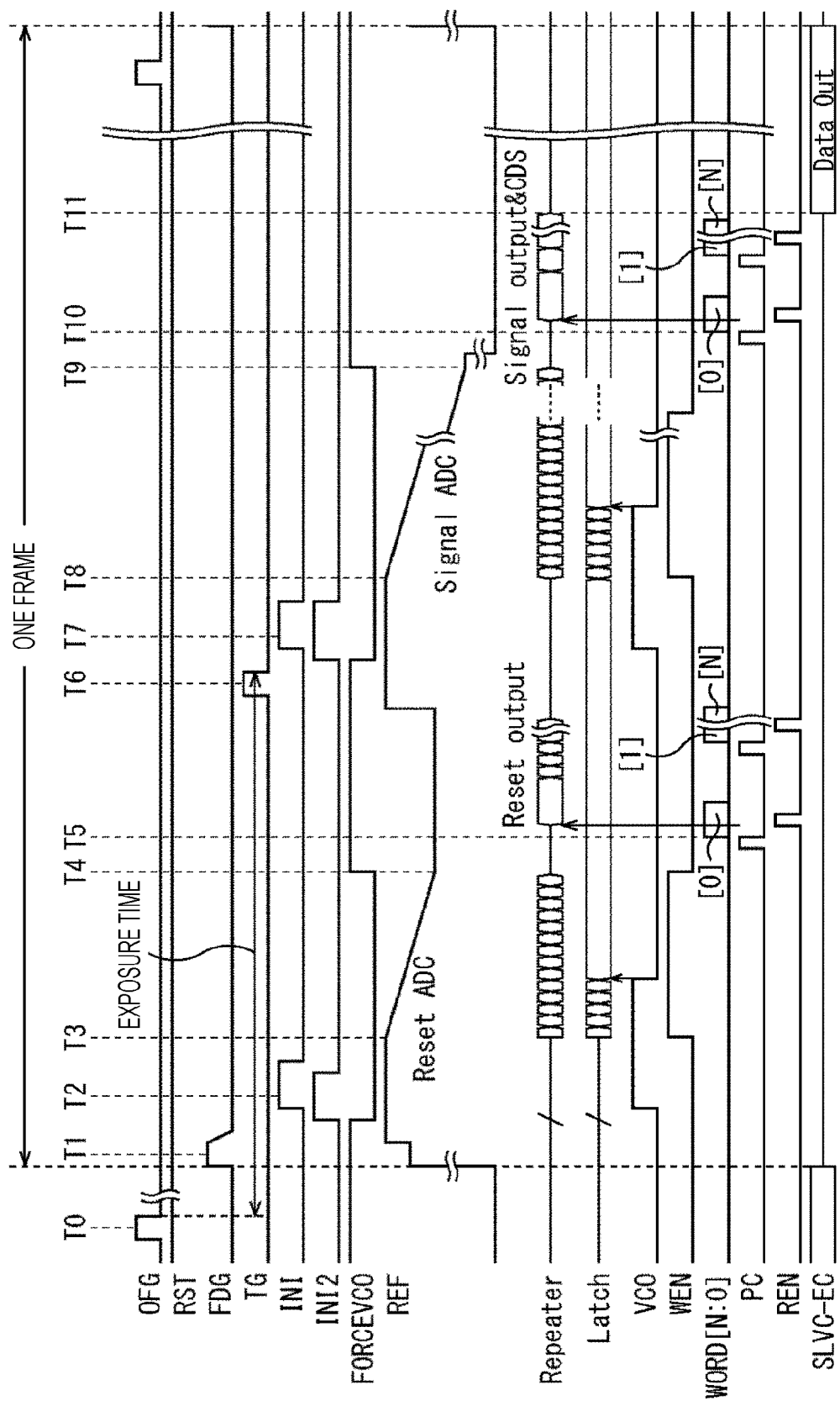
FIG. 16 is a diagram showing an example of a driving waveform for describing a pixel control method.

A control method of the pixel 2D-a of FIG. 10 will be described with reference to a driving waveform shown in FIG. 16. Note that the pixel 2D-b of FIG. 11 can also be controlled by a similar control method. Basically, there is no difference in function except for the reference sign of the control signal. Note that the writing of the code and the driving of the comparator 21 are performed simultaneously for all the pixels, resulting in a so-called global shutter operation, and the reading of the code stored in the signal storage unit 31 (latch 81) is sequentially performed by the cluster reading scheme.

First, at timing T0, as exposure control, the PD 52 is initialized by an OFG signal supplied to the discharge transistor 51. Then, the exposure (accumulation) period is from the timing when the OFG signal switches from ON to OFF to the timing when a TG signal supplied to the transfer transistor 53 switches from ON to OFF. Additionally, in a configuration in which the discharge transistor 51 is not provided, the exposure (accumulation) period is from the timing when the TG signal switches from ON to OFF one frame before to the timing when the TG signal next switches from ON to OFF. Note that while the OFG signal is illustrated as a pulse with a short ON period in FIG. 16, the ON period may be long, or the ON period may be input in two or more multiple pulses. Additionally, from the viewpoint of curbing overflow, an intermediate voltage, an intermediate pulse, or the like may be used as the OFG signal instead of the two values of ON and OFF.

At timing T1, the potential of the REF signal supplied to the transistor 60 is set to be the initial voltage of the FD unit 54, and the FD unit 54 is initialized by turning ON and then OFF an FDG signal supplied to the connection transistor 56. At this time, by turning OFF the FDG signal while raising the potential of the REF signal, it is possible to soft-reset (gradual transition from linear to saturation region to reduce kT/C noise to about ½) the FD unit 54. Additionally, since the operating range of the FD unit 54 can be set to a high voltage, the maximum charge amount handled can be improved, and the margin for signal transfer from the PD 52 to the FD unit 54 can be expanded. Additionally, by keeping the FDG signal supplied to the connection transistor 56 ON and performing similar control by an RST signal supplied to the reset transistor 58, the capacitor 57 connected between the reset transistor 58 and the connection transistor 56 can reduce the conversion efficiency. The RST signal and the FDG signal may be controlled at the same time instead of the fixed voltage, as a matter of course.

At timing T2, the second-stage floating portion of the comparator 21 is initialized by an INI signal supplied to the transistor 66 and an INI2 signal supplied to the transistor 67. Here, the INI signal and the INI2 signal are described separately, but they may be the same signal. When the INI signal and the INI2 signal are the same, one line can be merged, and the margin of layout design can be expanded. Additionally, by controlling a FORCEVCO signal supplied to the transistors 70 and 72, the output of the comparator 21 is in a ready state, and the latch 81 is in a state where a signal can be written.

At timing T3, a time code is written to the latch 81 from outside by a WEN signal, which is supplied to the tri-state buffer 92 and controls the signal input/output unit 42 (repeater) that inputs a time code generated by the time code generation unit 7 and outputs AD conversion pixel data which is a time code stored in the signal storage unit 31. At the same time, the REF signal, which is a monotonously decreasing slope signal, is input to the transistor 60, and at the timing when the REF signal is inverted with respect to the potential of the FD unit 54, a VCO signal is inverted. Then, at this timing, the time code that has been continuously written is stored in the latch 81, and the write operation to the corresponding latch 81 is stopped.

The response acceleration unit 24, which is a positive feedback circuit, is configured so that the VCO signal operates even when the current in the preceding stage of the comparator 21 is several nA. Accordingly, by once receiving the output of the previous stage of the comparator 21 by the transistor 64 of the second stage, a high power supply voltage fluctuation rejection ratio (PSRR) can be achieved. Subsequently, by connecting to the transistor 66 which is a high-voltage NMOS, the voltage of the floating portion V2nd beyond that is controlled so as not to be higher than the gate potential. As the gate potential, the same power supply as that of the logic circuit in the subsequent stage can be used, but a different voltage may be used. Additionally, the floating portion V2nd is provided with a positive feedback by a NOR circuit controlled by a test signal and a FORCEVCO signal as a malfunction prevention function, thereby enabling high-speed transition. Here, the time code written to the latch 81 is a fixed offset that is shifted by one code depending on the location because the signal input/output unit 42 includes multi-stage connection of flip-flops as shown in FIG. 12. However, as described later, the offset of the time code written in the latch 81 is canceled because the same offset is superimposed on the signal level by the operation of the CDS.

At timing T4, when the slope of the REF signal decreases to an arbitrary voltage, the AD conversion of the reset levels of all the pixels 2 ends. Note that the comparator 21 that has not been inverted for some reason is forcibly inverted by the FORCEVCO signal, thereby avoiding affecting the read processing in the subsequent stage. Examples of the reason why no inversion occurs include a failure in the circuit, or droppage of the potential to a lower voltage than the voltage at the end of the slope when strong light is applied to the PD 52. Then, by setting the voltage of the REF signal low at the same time as the end of the AD conversion, that is, setting it to GND, for example, the constant current of the comparator 21 can be set to zero. Thus, it is possible to curb power consumption until the next time the potential of the REF signal becomes high and a constant current flows through the comparator 21.

At timing T5, the AD conversion pixel data (digital data) stored in the latch 81 is read out. For example, since the latch 81 is formed with a size close to the minimum processable size for the reason of area, the driving force of the NMOS and the PMOS is not balanced. Accordingly, the read capability (time) differs depending on whether the signal set in the latch 81 is "H" or "L" and whether the read destination local bit line (LBL) is "H" or "L". Additionally, depending on the impedance of the LBL, there is a concern that the signal itself of the latch 81 changes when the signal of the latch 81 is read. In order to address such a concern, control is devised so that the impedance of the transistor 90 controlled by an xPC signal and the external impedance of the latch 81 when the latch signal is read are high as viewed from the latch 81.

Here, of the transistors, the NMOS has a higher transconductance gm than the PMOS. Hence, it is faster to lower the "H" of the LBL to "L" by the NMOS than to raise the "L" of the LBL to "H" by the PMOS. For this reason, before reading by the xPC signal, the power is set once and the LBL is preset to "H" every time. Then, when the read signal is "H", the reading from the latch 81 does not differ from the preset value. Hence, the reading is not affected even if the performance of the PMOS is low, and the PMOS can have a low driving force. On the other hand, when the read signal from the latch 81 is "L", the NMOS lowers the potential of the LBL precharged to "H". However, since a sufficient transconductance gm cannot be secured with a transistor of the minimum size, a gate width W is usually increased, and this increases the area cost.

Hence, by increasing the resistance of the switch 82 provided at the output of the latch 81 from that at the time of writing, the impedance of the LBL viewed from the inverters 83 and 84 inside the latch 81 is improved. Specifically, the switch 82 provided at the output of the latch 81 is controlled to turn ON both the transistor (NMOS) 201 and the transistor (PMOS) 202 at the time of writing, and to turn ON only the transistor (NMOS) 201 at the time of reading. Thus, high-speed and robust signal reading can be performed without increasing the size of the large number of NMOS transistors inside the latch 81. Then, the signal read out to the LBL is read out to the flip-flop with the AD conversion clock set to L with the REN signal turned ON, and the signals are transferred in a bucket-brigade manner to the output by inputting the AD conversion clock after the REN signal is turned OFF. Additionally, in order to perform the CDS, temporary writing is once performed on a memory such as a static random access memory (SRAM) (not shown) provided inside the solid-state imaging apparatus 1.

At timing T6, the voltage of the REF signal is returned to a high level, the TG signal supplied to the transfer transistor 53 is turned ON, and the charge of the PD 52 is transferred to the FD unit 54.

From timing T7 to timing T10, processing similar to that from timing T2 to timing T5 is performed, and AD conversion of the signal level is performed. Then, at timing T10, when the signal level is output, the reset level is read out from the once stored SRAM and subtracted from the signal level. As a result, a series of circuit noises including the fixed pattern noise of the comparator 21 and the signal input/output unit 42 and the random noise of the pixel 2 and the comparator 21 can be canceled (correlated double sampling).

At timing T11, processing of transmitting the signal to the outside of the solid-state imaging apparatus 1 through a signal readout circuit, through a high-speed serial interface such as scalable low voltage signaling with embedded clock (SLVS-EC) for example, is performed. Note that processing for narrowing the data band such as signal compression may be performed before this processing.

The pixel 2D-a is driven by the control method as described above, and it is possible to reduce the noise and increase the speed of the output signal.

Note that the signal storage unit 31 can be configured to store both the reset level code and the light reception signal level code, and output the codes to the outside of the solid-state imaging apparatus 1 sequentially or simultaneously by two or more repeaters. Additionally, as the solid-state imaging apparatus 1 including the comparator circuit 11, a stacked structure in which two or three semiconductor wafers are stacked, or a stacked structure in which more than three semiconductor wafers are stacked may be adopted. Additionally, in order to make the resolution of AD conversion variable, by performing control to make the code transition by the AD conversion clock finer at low illuminance and to make the code transition coarser at higher illuminance with the slope of the REF signal kept constant, it is possible to reduce the number of transitions of the circuit and improve power efficiency. Moreover, although not shown, in a case where the number of pixels and the number of circuits are increased and the control signal is insufficiently settled inside the solid-state imaging apparatus 1, the driving capability of the signal may be appropriately improved by performing buffering, for example, and the circuit may be changed in design.

Configuration Example of Electronic Device

The solid-state imaging apparatus 1 as described above can be applied to various electronic devices including an imaging system such as a digital still camera and a digital video camera, a mobile phone having an imaging function, and other devices having an imaging function, for example.

Figure 17:
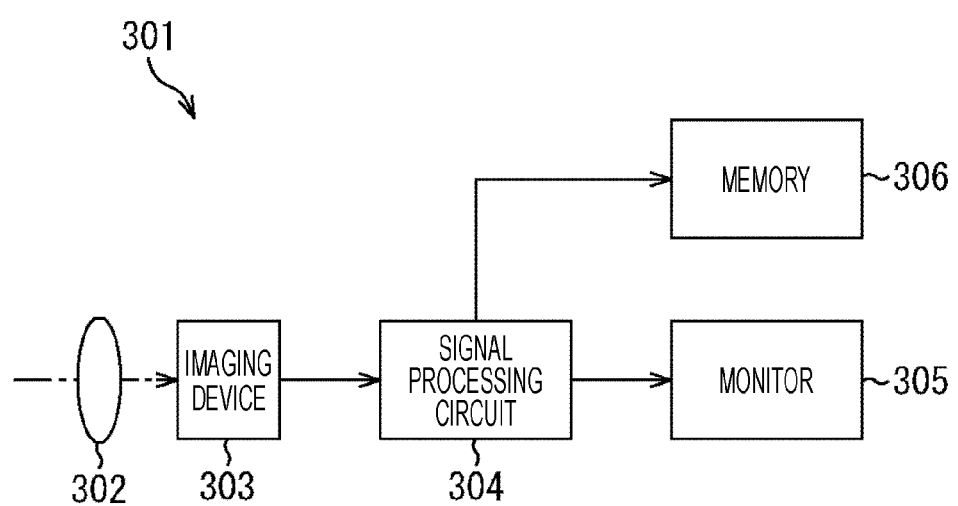
FIG. 17 is a block diagram showing a configuration example of an imager.

FIG. 17 is a block diagram showing a configuration example of an imager mounted on an electronic device.

As shown in FIG. 17, an imager 301 includes an optical system 302, an imaging device 303, a signal processing circuit 304, a monitor 305, and a memory 306, and can capture a still image and a moving image.

The optical system 302 includes one or more lenses, guides image light (incident light) from a subject to the imaging device 303, and forms an image on a light receiving surface (sensor unit) of the imaging device 303.

The solid-state imaging apparatus 1 described above is applied as the imaging device 303. In the imaging device 303, electrons are accumulated for a certain period according to an image formed on the light receiving surface through the optical system 302. Then, a signal corresponding to the electrons accumulated in the imaging device 303 is supplied to the signal processing circuit 304.

The signal processing circuit 304 performs various signal processing on the pixel signals output from the imaging device 303. An image (image data) obtained by performing signal processing by the signal processing circuit 304 is supplied to the monitor 305 for display, or supplied to the memory 306 to be stored (recorded).

In the imager 301 configured as described above, by applying the solid-state imaging apparatus 1 described above, a higher-quality image with less noise can be captured, for example.

Use Example of Image Sensor

Figure 18:
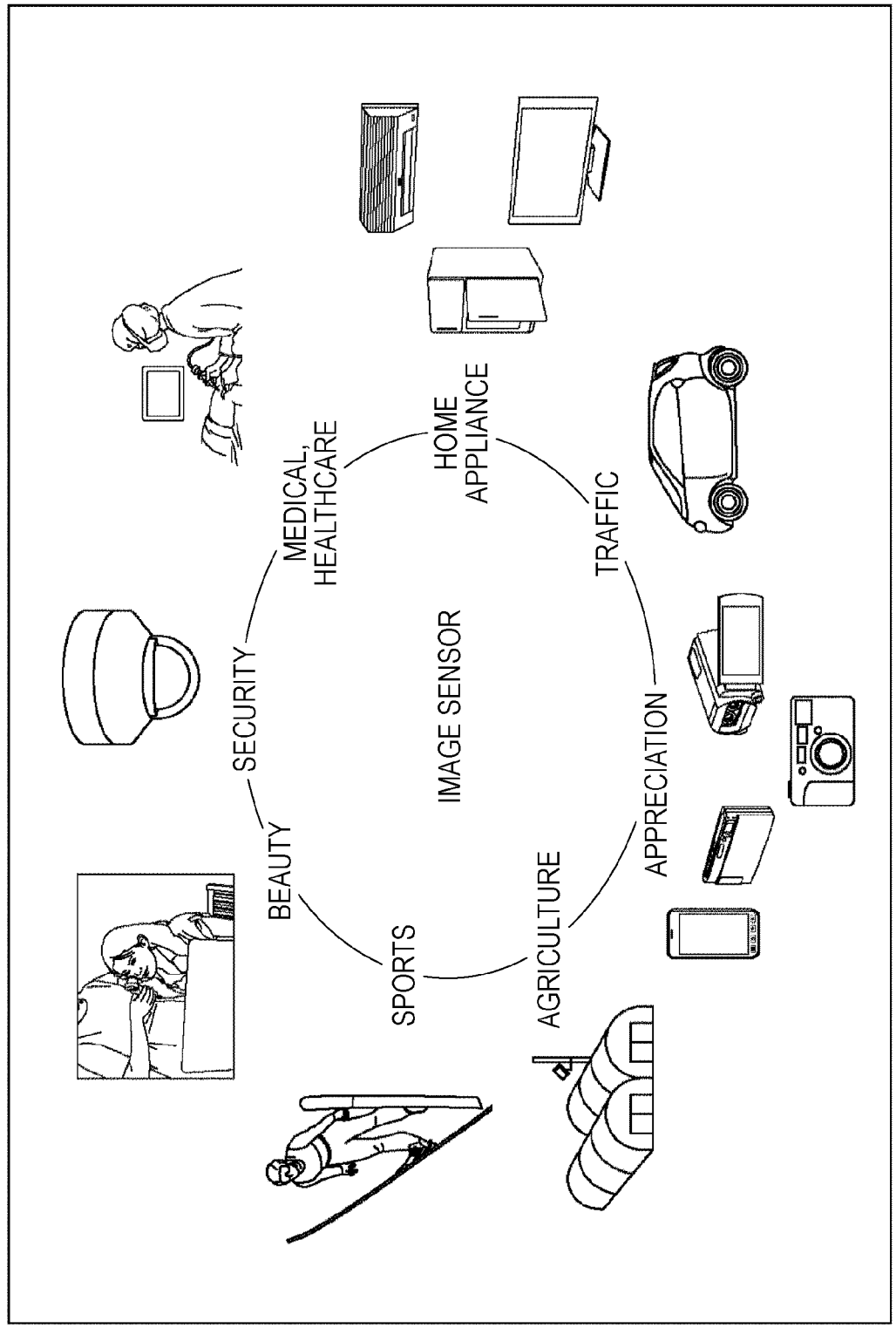
FIG. 18 is a diagram showing use examples of an image sensor.

FIG. 18 is a diagram showing use examples of the above-described image sensor (solid-state imaging apparatus).

The image sensor described above can be used in various cases of sensing light such as visible light, infrared light, ultraviolet light, and X-rays as described below, for example.

- A device for capturing an image to be provided for appreciation, such as a digital camera or a portable device with a camera function
- A device for traffic use, such as an on-vehicle sensor that captures an image of the front and back, the surroundings, the inside, or the like of a car for safe driving such as automatic stop or recognition or the like of the driver's condition, a monitoring camera that monitors traveling vehicles and roads, or a distance measurement sensor that measures the distance between vehicles or the like
- A device provided to a home appliance, such as a TV, a refrigerator, or an air conditioner, to capture an image of a user's gesture and perform device operation according to the gesture
- A device for medical and healthcare use, such as an endoscope or a device that performs blood vessel imaging by receiving infrared light
- A device for security use, such as a surveillance camera for crime prevention or a camera for person authentication
- A device for beauty use, such as a skin measuring instrument for capturing an image of the skin or a microscope for capturing an image of the scalp
- A device for sports use, such as an action camera or a wearable camera for sports application and the like
- A device for agricultural use, such as a camera for monitoring the condition of fields and crops Example of Application to Movable Body The technology of the present disclosure (present technology) can be applied to various products. For example, the technology of the present disclosure may be implemented as a device mounted on any of movable bodies including a car, an electric car, a hybrid electric car, a motorcycle, a bicycle, personal mobility, an airplane, a drone, a ship, a robot, and the like.

Figure 19:
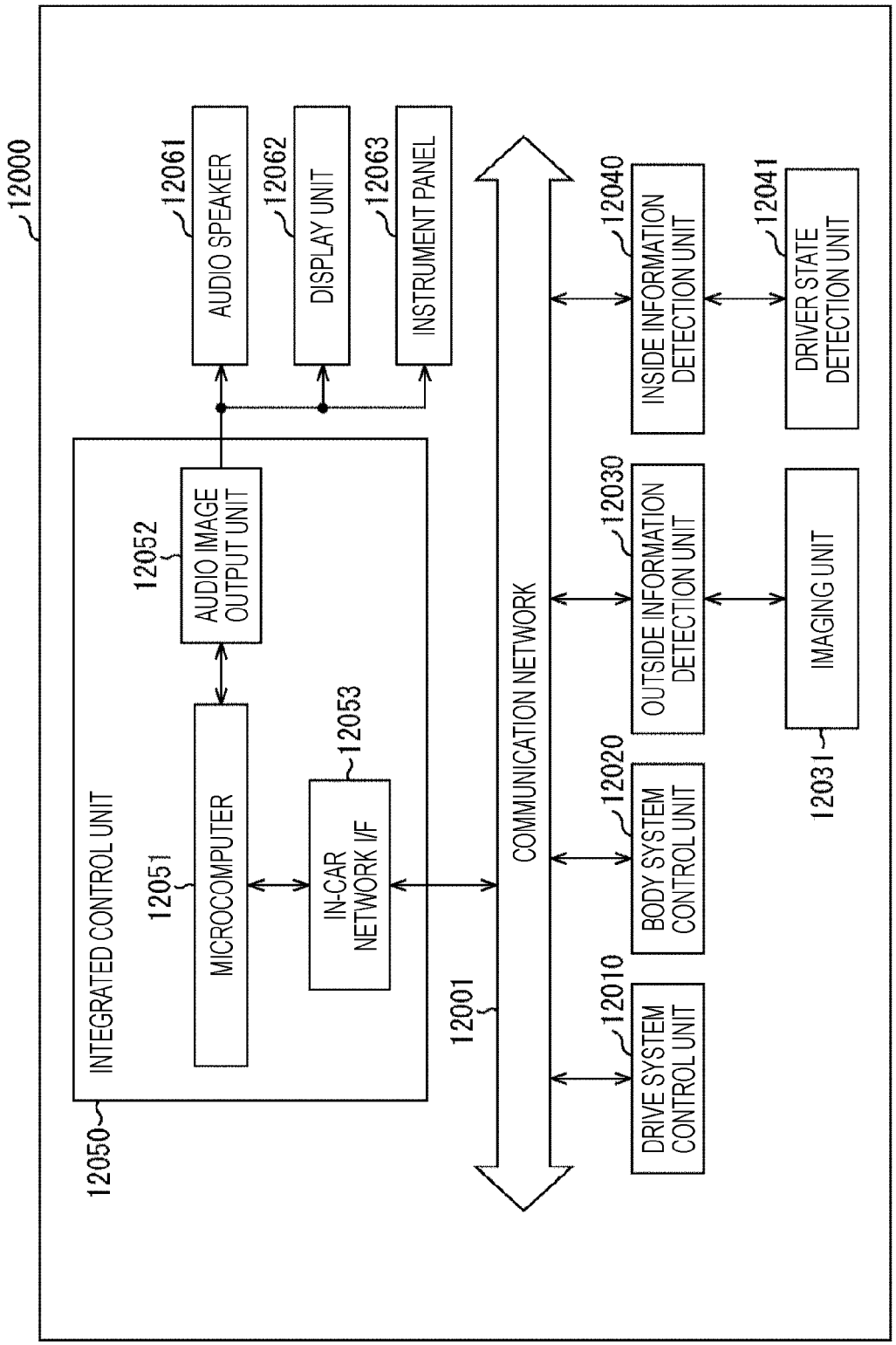
FIG. 19 is a block diagram showing an example of a schematic configuration of a vehicle control system.

FIG. 19 is a block diagram showing a schematic configuration example of a vehicle control system which is an example of a mobile control system to which the technology of the present disclosure can be applied.

A vehicle control system 12000 includes multiple electronic control units connected through a communication network 12001. In the example shown in FIG. 19, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an in-car network interface (I/F) 12053 are shown.

The drive system control unit 12010 controls the operation of devices related to the drive system of the vehicle according to various programs. For example, the drive system control unit 12010 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like.

The body system control unit 12020 controls the operation of various devices equipped on the vehicle body according to various programs. For example, the body system control unit 12020 functions as a controller of a keyless entry system, a smart key system, a power window device, or various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp, and the like of the vehicle.

The outside information detection unit 12030 detects information outside the vehicle equipped with the vehicle control system 12000. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal corresponding to the amount of light received. The imaging unit 12031 can output an electric signal as an image or can output the electrical signal as distance measurement information. Additionally, the light received by the imaging unit 12031 may be visible light or non-visible light such as infrared light.

The inside information detection unit 12040 detects information on the inside of the vehicle. For example, a driver state detection unit 12041 that detects a state of a driver is connected to the inside information detection unit 12040. The driver state detection unit 12041 includes a camera for capturing an image of the driver, for example, and the inside information detection unit 12040 may calculate the degree of fatigue or concentration of the driver or determine whether or not the driver is asleep, on the basis of the detection information input from the driver state detection unit 12041.

The microcomputer 12051 can calculate a control target value of the drive force generation device, the steering mechanism, or the braking device on the basis of the information on the outside or the inside of the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information on the outside of the vehicle acquired by the outside information detection unit 12030. For example, the microcomputer 12051 can control the headlamp according to the position of the preceding vehicle or oncoming vehicle detected by the outside information detection unit 12030, and perform coordinated control aimed for glare prevention such as switching from high beam to low beam.

The audio image output unit 12052 transmits an output signal of at least one of audio or image to an output device capable of visually or aurally giving notification of information to a passenger or the outside of a vehicle. In the example of FIG. 19, an audio speaker 12061, a display unit 12062, and an instrument panel 12063 are shown as examples of the output device. The display unit 12062 may include at least one of an onboard display or a head-up display, for example.

Figure 20:
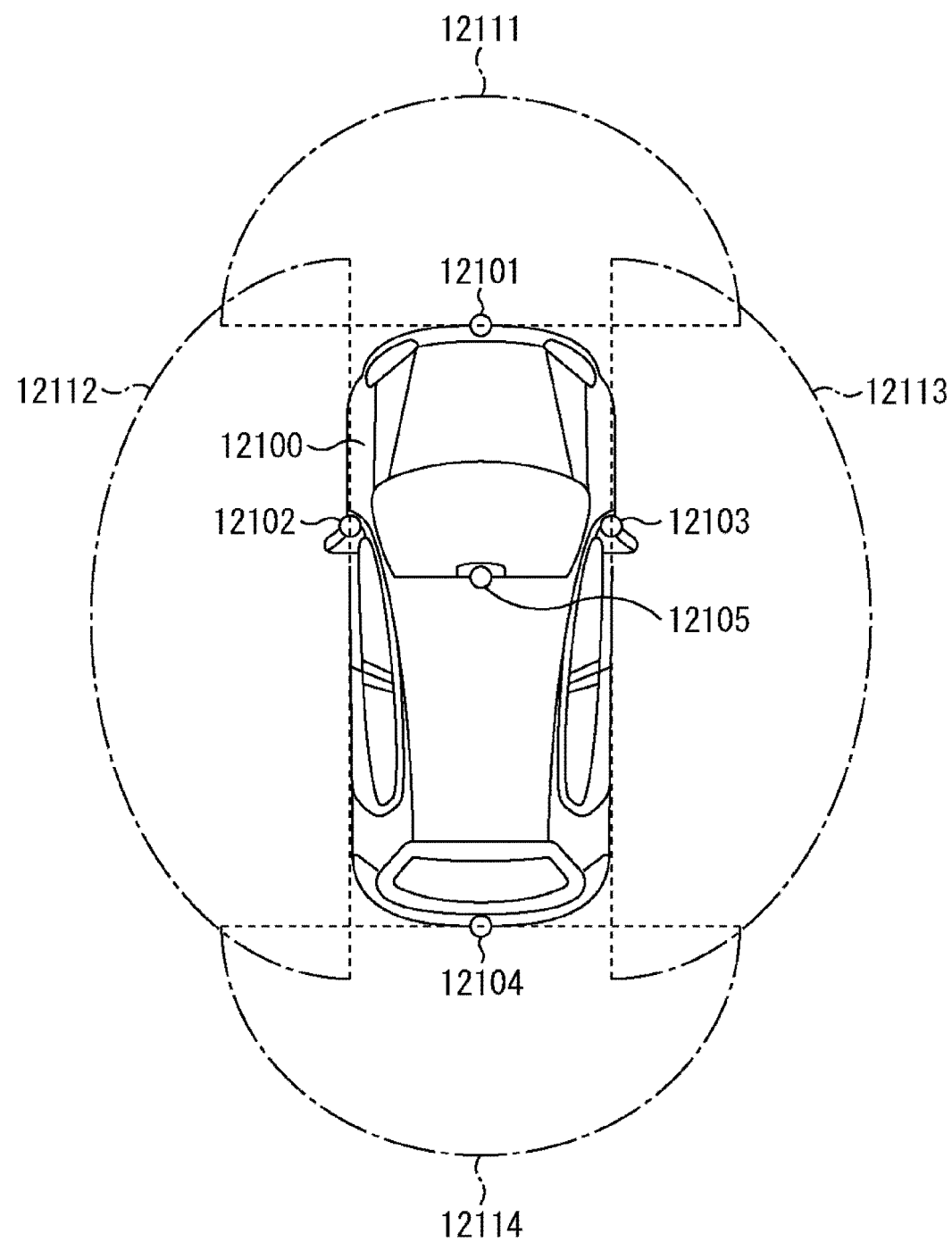
FIG. 20 is an explanatory view showing an example of installation positions of an outside information detection unit and an imaging unit.

FIG. 20 is a diagram showing an example of the installation position of the imaging unit 12031.

In FIG. 20, a vehicle 12100 includes imaging units 12101, 12102, 12103, 12104, and 12105 as the imaging unit 12031.

For example, the imaging units 12101, 12102, 12103, 12104, and 12105 are provided in positions such as a front nose, a side mirror, a rear bumper, a back door, and an upper portion of a windshield in the vehicle interior of the vehicle 12100. The imaging unit 12101 provided on the front nose and the imaging unit 12105 provided on the upper portion of the windshield in the vehicle interior mainly acquire images of the front of the vehicle 12100. The imaging units 12102 and 12103 provided on the side mirrors mainly acquire images of the sides of the vehicle 12100. The imaging unit 12104 provided in the rear bumper or the back door mainly acquires an image of the rear of the vehicle 12100. Images of the front acquired by the imaging units 12101 and 12105 are mainly used to detect a preceding vehicle or a pedestrian, an obstacle, a traffic light, a traffic sign, a lane, or the like.

Note that FIG. 20 shows an example of the imaging ranges of the imaging units 12101 to 12104. An imaging range 12111 indicates the imaging range of the imaging unit 12101 provided in the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided in the rear bumper or the back door. For example, by superimposing the pieces of image data captured by the imaging units 12101 to 12104, a bird's eye view image of the vehicle 12100 as viewed from above can be obtained.

At least one of the imaging units 12101 to 12104 may have a function of acquiring distance information. For example, at least one of the imaging units 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging units 12101 to 12104, to extract, as a preceding vehicle, the closest three-dimensional object on the traveling path of the vehicle 12100 in particular, the three-dimensional object traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging units 12101 to 12104, the microcomputer 12051 can extract three-dimensional object data regarding three-dimensional objects by classifying the data into a two-wheeled vehicle, an ordinary vehicle, a large vehicle, a pedestrian, and other three-dimensional objects such as a telephone pole, and use the data for automatic avoidance of obstacles. For example, the microcomputer 12051 identifies obstacles around the vehicle 12100 into obstacles visible and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, the microcomputer 12051 can perform driving support for collision avoidance by outputting a warning to the driver through the audio speaker 12061 or the display unit 12062, or by performing forcible deceleration or avoidance steering through the drive system control unit 12010.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. Such pedestrian recognition is performed by a procedure of extracting feature points in images captured by the imaging units 12101 to 12104 as infrared cameras, and a procedure of performing pattern matching processing on a series of feature points indicating the outline of an object to determine whether or not the object is a pedestrian, for example. If the microcomputer 12051 determines that a pedestrian is present in the images captured by the imaging units 12101 to 12104 and recognizes the pedestrian, the audio image output unit 12052 controls the display unit 12062, so that a square outline for emphasis is superimposed on the recognized pedestrian. Additionally, the audio image output unit 12052 may control the display unit 12062, so that an icon or the like indicating a pedestrian is displayed in a desired position.

Hereinabove, the example of the vehicle control system to which the technology of the present disclosure can be applied has been described. Of the above-described configuration, the technology of the present disclosure is applicable to the imaging unit 12031 and the like, for example. By applying the technology of the present disclosure to the imaging unit 12031 and the like, an image of a higher-quality captured image with less noise can be obtained. Hence, image recognition processing using the captured image can be performed with high accuracy, for example.

<Exemplar Combination of Configuration>

Note that the present technology can also be configured in the following manner.

(1)

A sensor element including:

a comparing unit that compares a predetermined detection signal with a predetermined reference signal;

a band limiting unit that performs band limiting by narrowing a band of a signal that changes according to a result of comparison by the comparing unit; and an amplification unit that amplifies and outputs the signal whose band has been limited through the band limiting unit.

(2)

The sensor element according to the above (1), in which the amplification unit includes a positive feedback circuit that feeds back and adds part of the output to the input.

(3)

The sensor element according to the above (1) or (2) further including a physical quantity detection unit that detects a predetermined physical quantity, in which the detection signal indicating an amount detected by the physical quantity detection unit is input to one input terminal of the comparing unit, and the reference signal which is a slope signal whose level monotonously decreases with time is input to another input terminal of the comparing unit.

(4)

The sensor element according to any one of the above (1) to (3) further including an array unit in which a comparator circuit having at least the comparing unit, the band limiting unit, and the amplification unit is arranged in a two-dimensional array.

(5)

The sensor element according to the above (3), in which the physical quantity detection unit and the comparator circuit having at least the comparing unit, the band limiting unit, and the amplification unit are arranged one-dimensionally, and detect the physical quantity in a linear manner.

(6)

The sensor element according to the above (3), in which the physical quantity detection unit and the comparator circuit having at least the comparing unit, the band limiting unit, and the amplification unit are arranged two-dimensionally, and detect the physical quantity in a planar manner.

(7)

The sensor element according to any one of the above (1) to (6) further including a pixel provided with a pixel circuit that has at least a photoelectric conversion unit that photoelectrically converts light into charges and accumulates the charges, and a charge-voltage conversion unit that converts the charges generated in the photoelectric conversion unit into a voltage, and a comparator circuit that has at least the comparing unit, the band limiting unit, and the amplification unit, in which the comparing unit compares a pixel signal output from the pixel circuit with the predetermined reference signal.

(8)

The sensor element according to the above (7) further including a charge transfer unit that transfers charges at a predetermined timing from the photoelectric conversion unit to the charge-voltage conversion unit.

(9)

The sensor element according to the above (8), in which the pixel circuit has a predetermined number of the photoelectric conversion units and a predetermined number of the charge transfer units, and the sensor element has a sharing structure in which the charge-voltage conversion unit is shared by a predetermined number of the photoelectric conversion units.

(10)

The sensor element according to the above (8), in which the sensor element has a sharing structure in which one photoelectric conversion unit is shared by a plurality of the pixels.

(11)

The sensor element according to any one of the above (1) to (10), in which the band limiting unit limits a band according to a capacity of a circuit.

(12)

The sensor element according to any one of the above (1) to (11), in which the band limiting unit limits a band by an output resistance of a transistor.

(13)

An electronic device including a sensor element having:

a comparing unit that compares a predetermined detection signal with a predetermined reference signal;

a band limiting unit that performs band limiting by narrowing a band of a signal that changes according to a result of comparison by the comparing unit; and an amplification unit that amplifies and outputs the signal whose band has been limited through the band limiting unit.

Note that the embodiments are not limited to the above-described embodiments, and various modifications can be made without departing from the scope of the present disclosure. Additionally, the effect described in the present specification is merely an illustration and is not restrictive. Hence, other effects can be obtained.

REFERENCE SIGNS LIST

1 Solid-state imaging apparatus
2 Pixel
3 Time code transfer section
4 Pixel array unit
5 Pixel driving circuit
6 DAC
7 Time code generation unit
8 Vertical driving circuit
9 Output unit
10 Timing generation circuit
11 Comparator circuit
12 Data storage section
13 ADC
14 Pixel circuit
16 Physical quantity detection circuit
17 Reference signal generation unit
21 Comparator
22 Band limiting unit
23 Amplification unit
24 Response acceleration unit
25 Physical quantity detection unit
26 Photoelectric conversion unit 27 Charge-voltage conversion unit
28 Transfer unit
30 Input/output control unit
31 Signal storage unit
41 Selection means
42 Signal input/output unit
43 Digital code generation unit
44 Signal processing unit
45 Output control unit
46 Initialization means
63 Capacitor
111 Transistor

The invention claimed is:

1. A sensor element comprising:
a comparing circuitry configured to
  receive a detection signal at a first input terminal,
  receive a predetermined reference signal at a second input terminal,
  compare the detection signal to the predetermined reference signal, and
  generate an output signal based on the comparison of the detection signal to the predetermined reference signal;
a band limiting circuitry configured to narrow a band of the output signal; and
a positive feedback circuitry configured to
  receive the output signal, and
  feedback part of the output signal to the first input terminal.

2. The sensor element according to claim 1, further comprising:
a physical quantity detection circuitry configured to detect a physical quantity, wherein
the detection signal indicates an amount detected by the physical quantity detection circuitry, and
the predetermined reference signal is a slope signal with a level that monotonously decreases over time.

3. The sensor element according to claim 1, further comprising:
a physical quantity detection circuitry configured to detect a physical quantity; and
a comparator circuit having at least the comparing circuitry, the band limiting circuitry, and the positive feedback circuitry and is arranged in a two-dimensional array.

4. The sensor element according to claim 3, wherein
the physical quantity detection circuitry and the comparator circuit are arranged one-dimensionally, and detect the physical quantity in a linear manner.

5. The sensor element according to claim 3, wherein
the physical quantity detection circuitry and the comparator circuit are arranged two-dimensionally, and detect the physical quantity in a planar manner.

6. The sensor element according to claim 1, further comprising:
a pixel including
  a pixel circuit that has at least a photoelectric conversion circuitry configured to photoelectrically convert light into charges and accumulates the charges, and
  a charge-voltage conversion circuitry configured to convert the charges generated in the photoelectric conversion circuitry into a voltage, and
  a comparator circuit that has at least the comparing circuitry, the band limiting circuitry, and the positive feedback circuitry, wherein
the detection signal is a pixel signal that is output from the pixel circuit.

7. The sensor element according to claim 6, further comprising:
a charge transfer circuitry configured to transfer the charges at a predetermined timing from the photoelectric conversion circuitry to the charge-voltage conversion circuitry.

8. The sensor element according to claim 7, wherein
the pixel circuit has a predetermined number of the photoelectric conversion circuitries and a predetermined number of the charge transfer circuitries, and
wherein the charge-voltage conversion circuitry is shared by the predetermined number of the photoelectric conversion circuitries.

9. The sensor element according to claim 7, wherein
one photoelectric conversion circuitry is shared by a plurality of pixels including the pixel.

10. The sensor element according to claim 1, wherein
the band limiting circuitry is configured to limit the band of the output signal according to a capacity of a circuit.

11. The sensor element according to claim 1, wherein
the band limiting circuitry is configured to limit the band of the output signal according to an output resistance of a transistor.

12. An electronic device comprising:
a sensor element including
  a comparing circuitry configured to
    receive a detection signal at a first input terminal,
    receive a predetermined reference signal at a second input terminal,
    compare a predetermined detection signal with the predetermined reference signal, and
    generate an output signal based on the comparison of the detection signal to the predetermined reference signal;
  a band limiting circuitry configured to narrow a band of the output signal; and
  a positive feedback circuitry configured to
    receive the output signal, and
    feedback part of the output signal to the first input terminal.

13. The electronic device according to claim 12, further comprising:
a physical quantity detection circuitry configured to detect a physical quantity, wherein
the detection signal indicates an amount detected by the physical quantity detection circuitry, and
the predetermined reference signal is a slope signal with a level that monotonously decreases over time.

14. The electronic device according to claim 12, further comprising:
a physical quantity detection circuitry configured to detect a physical quantity; and
a comparator circuit having at least the comparing circuitry, the band limiting circuitry, and the positive feedback circuitry is arranged in a two-dimensional array.

15. The electronic device according to claim 14, wherein
the physical quantity detection circuitry and the comparator circuit are arranged one-dimensionally, and detect the physical quantity in a linear manner.

16. The electronic device according to claim 14, wherein
the physical quantity detection circuitry and the comparator circuit are arranged two-dimensionally, and detect the physical quantity in a planar manner.

17. The electronic device according to claim 12, further comprising:
- a pixel including
  - a pixel circuit that has at least a photoelectric conversion circuitry configured to photoelectrically convert light into charges and accumulates the charges, and a charge-voltage conversion circuitry configured to convert the charges generated in the photoelectric conversion circuitry into a voltage, and
  - a comparator circuit that has at least the comparing circuitry, the band limiting circuitry, and the positive feedback circuitry, wherein
  - the detection signal is a pixel signal that is output from the pixel circuit.

18. The electronic device according to claim 17, further comprising:
- a charge transfer circuitry configured to transfer the charges at a predetermined timing from the photoelectric conversion circuitry to the charge-voltage conversion circuitry.

19. The electronic device according to claim 12, wherein the band limiting circuitry is configured to limit the band of the output signal according to a capacity of a circuit.

20. The electronic device according to claim 12, wherein the band limiting circuitry is configured to limit the band of the output signal by an output resistance of a transistor.

\* \* \* \* \*